United States Patent
Kamo et al.

(10) Patent No.: US 10,619,092 B2
(45) Date of Patent: Apr. 14, 2020

(54) WAVELENGTH CONVERSION FILM

(71) Applicant: FUJIFILM Corporation, Tokyo (JP)

(72) Inventors: Makoto Kamo, Kanagawa (JP);
Tatsuya Oba, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 359 days.

(21) Appl. No.: 15/660,300

(22) Filed: Jul. 26, 2017

(65) Prior Publication Data
US 2017/0321114 A1    Nov. 9, 2017

Related U.S. Application Data

(63) Continuation of application No. PCT/JP2016/000502, filed on Feb. 1, 2016.

(30) Foreign Application Priority Data

Feb. 2, 2015 (JP) ................ 2015-018859

(51) Int. Cl.
| | | |
|---|---|---|
| C09K 11/02 | (2006.01) | |
| F21V 9/30 | (2018.01) | |
| C09D 201/00 | (2006.01) | |
| G02F 1/1335 | (2006.01) | |
| G02B 5/20 | (2006.01) | |
| G02B 1/10 | (2015.01) | |

(52) U.S. Cl.
CPC .......... C09K 11/02 (2013.01); C09D 201/00 (2013.01); F21V 9/30 (2018.02); G02B 1/10 (2013.01); G02B 5/20 (2013.01); G02F 1/1335 (2013.01); G02F 2001/133614 (2013.01); G02F 2202/36 (2013.01)

(58) Field of Classification Search
CPC .. C09K 11/02; C09K 3/00; F21V 9/30; C09D 201/00; G02B 1/10; G02B 5/20; G02F 1/1335
USPC .................................................. 252/301.36
See application file for complete search history.

(56) References Cited

U.S. PATENT DOCUMENTS

2011/0162711 A1    7/2011   Takeuchi et al.

FOREIGN PATENT DOCUMENTS

| JP | H02-271933 A | 11/1990 |
|---|---|---|
| JP | 2000-188182 A | 7/2000 |
| JP | 2002-510866 A | 4/2002 |
| JP | 2012-054284 A | 3/2012 |
| JP | 2012-155999 A | 8/2012 |
| JP | 2013-544018 A | 12/2013 |
| WO | 99/50916 A1 | 10/1999 |
| WO | 2009/148131 A1 | 12/2009 |
| WO | 2012/064562 A1 | 5/2012 |
| WO | 2014/017501 A1 | 1/2014 |

OTHER PUBLICATIONS

Notification of Reasons for Refusal issued by the Japanese Patent Office (JPO) dated May 8, 2018, in connection with Japanese Patent Application No. 2015-018859.
Office Action, issued by the Korean Intellectual Property Office (KIPO) dated Dec. 14, 2018, in connection with Korean Patent Application No. 10-2017-7021052.
International Search Report issued in connection with International Patent Application No. PCT/JP2016/000502 dated May 17, 2016.
Written Opinion issued in connection with International Patent Application No. PCT/JP2016/000502 dated May 17, 2016.

*Primary Examiner* — Edward M Johnson
(74) *Attorney, Agent, or Firm* — Edwards Neils LLC; Jean C. Edwards, Esq.

(57) ABSTRACT

Provided is a wavelength conversion film-forming composition which forms a wavelength conversion film by being applied to a substrate to form a coating film and curing the coating film, the wavelength conversion film-forming composition including at least quantum dots, a volatile component, and a binder that is soluble in the volatile component and/or a binder precursor that is soluble in or compatible with the volatile component, in which the wavelength conversion film-forming composition is gellable in the presence of the volatile component.

8 Claims, 4 Drawing Sheets

WAVELENGTH CONVERSION FILM

CROSS-REFERENCE TO RELATED APPLICATIONS

This application is a continuation application of International Application No. PCT/JP2016/000502, filed Feb. 1, 2016, which was published under PCT Article 21(2) in Japanese, the disclosure of which is incorporated herein by reference in its entirety. Further, this application claims priority from Japanese Patent Application No. 2015-018859, filed Feb. 2, 2015, the disclosure of which is incorporated herein by reference in its entirety.

BACKGROUND OF THE INVENTION

1. Field of the Invention

The present invention relates to a phosphor dispersion composition used for forming a phosphor molded body such as a wavelength conversion film that is irradiated with excitation light to emit fluorescence, a phosphor molded body obtained using the same, and a wavelength conversion film. In addition, the present invention relates to a wavelength conversion member including the wavelength conversion film, and a backlight unit and a liquid crystal display device including the same.

2. Description of the Related Art

A technique of dispersing quantum dots (also referred to as QDs) as a phosphor in a polymer matrix and molding the dispersion to obtain a wavelength conversion material is known (for example, JP2002-510866A). Quantum dots are a phosphor having a high emission efficiency and a narrow fluorescence emission spectrum. In a case where quantum dots are used as a phosphor and a white light source is configured using mixed light including excitation light and fluorescence emitted from the quantum dots or using only fluorescence emitted from the quantum dots, the light source having excellent color reproducibility can be realized.

In particular, by forming a surface light source using a wavelength conversion material (wavelength conversion film), which is molded into a sheet shape, and using this surface light source as a backlight unit of a liquid crystal display device (hereinafter, also referred to as "LCD"), a liquid crystal display device having an excellent color reproduction range and low power consumption is obtained. Therefore, recently, this technique has attracted large attention.

As a method of forming a wavelength conversion film, the following methods are known: a cast method of dissolving quantum dots and a polymer matrix (binder) or a precursor thereof in a solvent to prepare a coating solution, applying the coating solution to a substrate, and removing the solvent from the coating film (for example, JP1990-271933A (H2-271933A)); and a method of dispersing quantum dots in a binder precursor including a polymerizable compound to prepare a coating solution, applying the coating solution to a substrate, and curing the coating film by heating or light irradiation while maintaining the dispersed state as it is (for example, JP2013-544018A).

SUMMARY OF THE INVENTION

During the formation of a wavelength conversion film using the cast method described in JP1990-271933A (H2-271933A), the quantum dots are likely to aggregate in a precursor of the wavelength conversion film during the volatilization of the solvent, the aggregated quantum dots interact with each other, and thus there is a problem in that a desired emission efficiency cannot be obtained.

In addition, in the method described in JP2013-544018A in which the polymerizable compound included in the binder precursor is polymerized and cured by heating or light irradiation, the problem such as the aggregation of the quantum dots or a decrease in emission efficiency caused by the aggregation is not likely to occur, but a polymerizable compound having a viscosity suitable for coating is limited, and there is a problem in that the degree of freedom for material design is low.

The present invention has been made in consideration of the above-described circumstances, and an object thereof is to provide a wavelength conversion film-forming composition and a method of manufacturing a wavelength conversion film, in which the degree of freedom for material design is high and with which a wavelength conversion film can be formed while suppressing aggregation of quantum dots during curing.

Another object of the present invention is to provide: a wavelength conversion film including at least one kind of quantum dots that are excited by excitation light to emit fluorescence and are dispersed in an organic matrix, the wavelength conversion film having a small amount of aggregated quantum dots and having a high emission efficiency; and a wavelength conversion member, a backlight unit, and a liquid crystal display device including the same wavelength conversion film.

The present inventors found that, in a case where a wavelength conversion film including at least one kind of quantum dots, which are excited by excitation light to emit fluorescence and are dispersed in an organic matrix, is manufactured using a coating method, aggregation of the quantum dots occurs during removal of a volatile component such as a solvent, and performed a thorough investigation on a configuration of a coating solution capable of suppressing the aggregation in consideration of the above finding.

The present inventors focused on a mechanism in which quantum dots in a coating film move close to each other due to high mobility thereof during removal of a volatile component and aggregate due to an interaction therebetween. As a result, it was found that a coating film during coating is liquid, however, by rapidly increasing the viscosity of the coating film after coating so as to cause the coating film to gel, the mobility of quantum dots can be limited during removal of a volatile component, and thus the aggregation of quantum dots can be suppressed. Based on this finding, the present invention was conceived.

That is, according to the present invention, there is provided a wavelength conversion film-forming composition which forms a wavelength conversion film by being applied to a substrate to form a coating film and curing the coating film, the wavelength conversion film-forming composition comprising at least quantum dots, a volatile component, and a binder that is soluble in the volatile component and/or a binder precursor that is soluble in or compatible with the volatile component, in which the wavelength conversion film-forming composition is gellable in the presence of the volatile component.

In this specification. "volatile component" refers to a component having a vapor pressure of 1.0 hPa or higher at 20° C. and capable of substantially maintaining the above-described vapor pressure in a state where it is included in the wavelength conversion film-forming composition according to the present invention and in a wavelength conversion film which is formed using the wavelength conversion film-forming composition.

In addition, in this specification, "binder" refers to a polymer compound with which a molded body can be formed by dispersing quantum dots therein to be supported thereon.

In this specification, "binder precursor" is a collective term for compounds which can form a binder through chain polymerization, condensation, or the like. In particular, in a case where chain polymerization is used, general compounds called polymerizable monomers are binder precursors.

In addition, in this specification, "gellable" represents that a state before a gelling step described below where the viscosity is lower than 200 Pa·s (hereinafter, this state will be referred to as "sol state") can be changed to a state after the gelling step where the viscosity is 200 Pa·s or higher (hereinafter, this state will be referred to as "gel state"). The viscosity described herein is measured using a rotary viscometer at a shear rate of 1 $[s^{-1}]$. However, the present invention is not limited to this configuration because the viscosity dynamically varies in a case where the wavelength conversion film-forming composition "is caused to gel by changing shear conditions" as described below.

A first preferable aspect of the wavelength conversion film-forming composition according to the present invention is a composition comprising the binder having an upper critical solution temperature or the binder having a lower critical solution temperature. In this aspect, it is more preferable that the wavelength conversion film-forming composition comprises cellulose acylate and/or polyvinyl alcohol as the binder having the upper critical solution temperature.

A second preferable aspect of the wavelength conversion film-forming composition according to the present invention is a composition comprising the binder precursor and a polymerization initiator of the binder precursor, in which the wavelength conversion film-forming composition is caused to gel by polymerizing at least a part of the binder precursor. In this aspect, it is preferable that the wavelength conversion film-forming composition further includes the binder, and it is more preferable that the wavelength conversion film-forming composition further includes a thixotropy imparting agent.

A third preferable aspect of the wavelength conversion film-forming composition according to the present invention is a composition comprising a thixotropy imparting agent. In this aspect, it is preferable that the wavelength conversion film-forming composition comprises the binder precursor as the volatile component and further comprises a polymerization initiator of the binder precursor.

According to the present invention, there is provided a method of forming a wavelength conversion film sequentially comprising:

a wavelength conversion film-forming composition preparing step of preparing a wavelength conversion film-forming composition including at least quantum dots, a volatile component, and a binder that is soluble in the volatile component and/or a binder precursor that is soluble in or compatible with the volatile component, the wavelength conversion film-forming composition being gellable in the presence of the volatile component;

a coating film forming step of forming a coating film of the wavelength conversion film-forming composition by applying the wavelength conversion film-forming composition to a substrate;

a gelling step of forming a gel film including the volatile component by performing at least one treatment of a cooling treatment, a heating treatment, a light irradiation treatment, an energy ray irradiation treatment, or a shear force changing treatment on the coating film so as to cause the coating film to gel; and a volatile component removal step of removing the volatile component from the gel film.

In this specification, "removing the volatile component" in the volatile component removal step represents that the content of the volatile component in the wavelength conversion film is reduced to be lower than 0.2 parts by mass with respect to 100 parts by mass of the wavelength conversion film obtained by curing.

In a first preferable aspect of the method of manufacturing a wavelength conversion film according to the present invention, the wavelength conversion film-forming composition includes the binder having an upper critical solution temperature, and in the gelling step, the gel film is formed by performing the cooling treatment on the coating film. In this aspect, it is more preferable that the wavelength conversion film-forming composition includes cellulose acylate and/or polyvinyl alcohol as the binder having the upper critical solution temperature.

In a second preferable aspect of the method of manufacturing a wavelength conversion film according to the present invention, the wavelength conversion film-forming composition includes the binder precursor and a polymerization initiator of the binder precursor, and in the gelling step, the gel film is formed by performing the heating treatment or the light irradiation treatment on the coating film to polymerize at least a part of the binder precursor.

In a third preferable aspect of the method of manufacturing a wavelength conversion film according to the present invention, the wavelength conversion film-forming composition includes a thixotropy imparting agent, and in the gelling step, the gel film is formed by performing the shear force changing treatment on the coating film.

In the volatile component removal step, it is preferable that 90 mass % or higher of the volatile component is removed by volatilization from the gel film.

In this specification, "the amount of the volatile component remaining in the gel film" refers to the amount of the volatile component remaining in the gel film immediately after the gelling step. The amount of the volatile component can be determined by extracting the gel film immediately after the gelling step, drying the gel film at 180° C. for 1 hour, and measuring a weight change before and after the drying. However, in a case where the volatile component forms a new bond in the film due to polymerization or the like which is performed after volatilization by heating, the amount of the volatile component can be determined by measuring a weight change before drying under reproduced pressure instead of drying by heating.

According to the present invention, there is provided a wavelength conversion film comprising: at least one kind of quantum dots that are excited by excitation light to emit fluorescence and are dispersed in an organic matrix, in which the wavelength conversion film is formed using the method of manufacturing a wavelength conversion film according to any the present invention.

According to the present invention, there is provided a wavelength conversion member comprising:

a wavelength conversion film including at least one kind of quantum dots that are excited by excitation light to emit fluorescence and are dispersed in an organic matrix; and a barrier layer that is provided on at least one main surface of the wavelength conversion film, in which the wavelength conversion film is manufactured using the method of manufacturing a wavelength conversion film according to the present invention.

According to the present invention, there is provided a backlight unit comprising:

a surface light source that emits primary light;

the wavelength conversion member according to the present invention that is provided on the surface light source;

a retroreflecting member that is disposed to face the surface light source with the wavelength conversion member interposed therebetween; and a reflection plate that is disposed to face the wavelength conversion member with the surface light source interposed therebetween, in which the wavelength conversion member is excited by excitation light, which is at least a portion of the primary light emitted from the surface light source, to emit the fluorescence and emits at least light which includes secondary light including the fluorescence.

According to the present invention, there is provided a liquid crystal display device comprising:

the backlight unit according to the present invention; and a liquid crystal unit that is disposed to face the retroreflecting member side of the backlight unit.

The wavelength conversion film-forming composition according to the present invention includes at least quantum dots, a volatile component, and a binder that is soluble in the volatile component and/or a binder precursor that is soluble in or compatible with the volatile component, and the wavelength conversion film-forming composition is gellable in the presence of the volatile component. According to this configuration, the coating film of the wavelength conversion film-forming composition including the volatile component can be caused to gel in a state where it includes the volatile component, and the volatile component removal step where the quantum dots are likely to aggregate can be performed in a state where the mobility of the quantum dots is controlled. Accordingly, by using the wavelength conversion film-forming composition according to the present invention, the degree of freedom for material design is high, and a wavelength conversion film can be formed while suppressing aggregation of the quantum dots during curing.

According to the present invention, it is possible to provide: a wavelength conversion film including at least one kind of quantum dots that are excited by excitation light to emit fluorescence and are dispersed in an organic matrix, the wavelength conversion film having a small amount of aggregated quantum dots and having a high emission efficiency; and a wavelength conversion member, a backlight unit, and a liquid crystal display device including the same wavelength conversion film.

DESCRIPTION OF THE PREFERRED EMBODIMENTS

Figure 1:
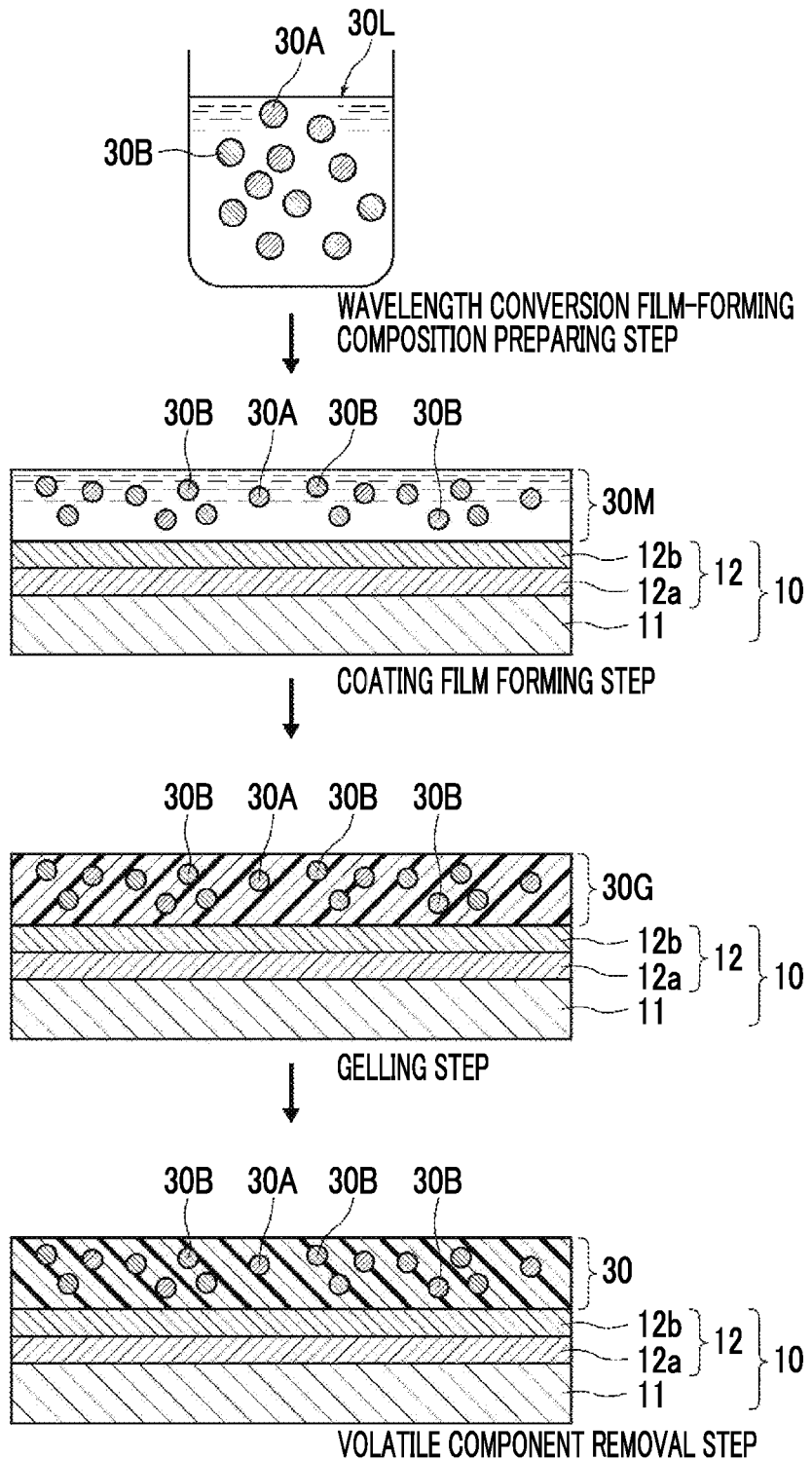
FIG. 1 is a flowchart schematically showing a first preferable aspect of a method of manufacturing a wavelength conversion film according to the present invention.

[Wavelength Conversion Film-Forming Composition and Method of Manufacturing Wavelength Conversion Film]
[Wavelength Conversion Film-Forming Composition]

A wavelength conversion film-forming composition according to the present invention forms a wavelength conversion film by being applied to a substrate to form a coating film and curing the coating film.

This wavelength conversion film-forming composition includes at least quantum dots, a volatile component, and a binder that is soluble in the volatile component and/or a binder precursor that is soluble in or compatible with the volatile component.

The wavelength conversion film-forming composition is gellable in the presence of the volatile component.

Hereinafter, the wavelength conversion film-forming composition according to the present invention will also be abbreviated as the composition according to the present invention.

The composition according to the present invention can be realized by including a material (gelling agent) with which an intermolecular interaction can be caused to occur or a covalent bond can be formed in a gelling step described below. The gelling agent may be a binder itself, may be a binder precursor itself, or may be another material which is separately added. Hereinafter, components of the composition according to the present invention will be described.

<Quantum Dots>

In the composition according to the present invention, the quantum dots are excited by the excitation light to emit the fluorescence. The wavelength conversion film includes at least one kind of quantum dots and may include two or more kinds of quantum dots having different light emitting properties. Well-known kinds of quantum dots include quantum dots (A) having a center emission wavelength in a wavelength range of 600 nm to 680 nm, quantum dots (B) having a center emission wavelength in a wavelength range of 520 nm to 560 nm, and quantum dots (C) having a center emission wavelength in a wavelength range of 400 nm to 500 nm. The quantum dots (A) are excited by the excitation light to emit red light, the quantum dots (B) are excited by the excitation light to emit green light, and the quantum dots (C) are excited by the excitation light to emit blue light. For example, in a case where blue light is incident as excitation light on the wavelength conversion film including the quantum dots (A) and the quantum dots (B), white light can be realized by red light emitted from the quantum dots (A), green light emitted from the quantum dots (B), and blue light having passed through the wavelength conversion film. In addition, in a case where ultraviolet light is incident as excitation light on the wavelength conversion film including the quantum dots (A), (B), and (C), white light can be realized by red light emitted from the quantum dots (A), green light emitted from the quantum dots (B), and blue light emitted from the quantum dots (C).

In addition to the above description, the details of the quantum dots can be found in, for example, paragraphs "0060" to "0066" of JP2012-169271A, but the present invention is not limited thereto. As the quantum dots, a commercially available product can be used without any particular limitation. The emission wavelength of the quantum dots can be typically adjusted by adjusting the composition of particles, the size of particles, or both the composition and the size of particles.

The wavelength conversion film-forming composition according to the present invention is used in a state where the quantum dots are dispersed in the composition. The quantum dots may be added to the polymerizable composition in the form of particles or in the form of a dispersion in which they are dispersed in a solvent. It is preferable that the quantum dots are added in the form of a dispersion from the viewpoint of suppressing aggregation of the quantum dots. The solvent used herein is not particularly limited. For example, 0.01 parts by mass to 10 parts by mass of the quantum dots can be added to the composition according to the present invention with respect to 100 parts by mass of the total mass of the composition.

<Volatile Component>

The composition according to the present invention includes at least a volatile component. The volatile component has, for example, a function (dispersion stabilizing function) as a dispersion medium for stabilizing the dispersed state of the quantum dots, a function (concentration adjusting function) as a solvent for dilution, and a function (dissolution function) as a solvent for dissolving and dispersing a binder or a binder precursor and optionally added components such as another gelling agent or other functional additives to obtain a solution or a dispersion.

At least a part of the volatile component is volatilized and removed during curing of the wavelength conversion film. At this time, in order to easily volatilize and remove the volatile component, it is preferable that the boiling point of volatile component is low. As described above, a vapor pressure of the volatile component at 20° C. is 1.0 hPa or higher and is preferably 3 hPa to 600 hPa, and more preferably 10 hPa to 500 hPa. The boiling point of the volatile component under a normal pressure is preferably in a range of 30° C. to 180° C., more preferably in a range of 35° C. to 160° C., and still more preferably in a range of 38° C. to 150° C. According to the volatile component having the above-described configuration, the solvent can be rapidly removed, and shape abnormalities caused by excessively rapid volatilization of the solvent, for example, formation of unevenness in the vicinity of a surface or formation of coarse bubbles having several millimeters in the film can be prevented.

A major part of the volatile component is removed after a gelling step as described below. However, volatilization of a part of the volatile component before or during the gelling step such as natural volatilization does not limit the content of the present invention. In addition, in order to adjust the concentration or composition ratio of a component in the composition before coating or in the coating film, a step of removing a part of the volatile component before the gelling step may be intentionally provided.

The volatile component is removed after the gelling step. In a case where the amount of the volatile component remaining after the gelling step is excessively large, internal defects may occur in a sealing configuration of a barrier film described below. Therefore, the amount of the remaining volatile component is less than 0.2 parts by mass and is preferably 0.1 parts by mass or less and more preferably 0.05 parts by mass with respect to 100 parts by mass of the obtained wavelength conversion film. Regarding a removing method, the volatile component may be removed by heating and drying it to be volatilized, or may be removed by changing it into a non-volatile component through a chemical reaction.

A preferable example of the volatile component can be selected such that the above-described functions are exhibited with respect to the above-described quantum dots, or with respect to the binder, the binder precursor, the other gelling agent, and the other functional additives described below. Examples of the volatile component include dibutyl ether, dimethoxyethane, diethoxyethane, propylene oxide, 1,4-dioxane, 1,3-dioxolane, 1,3,5-trioxane, tetrahydrofuran, anisole, phenetole, dimethyl carbonate, methyl ethyl carbonate, diethyl carbonate, acetone, methyl ethyl ketone (MEK), diethyl ketone, dipropyl ketone, diisobutyl ketone, cyclopentanone, cyclohexanone, methylcyclohexanone, ethyl formate, propyl formate, pentyl formate, methyl acetate, ethyl acetate, propyl acetate, methyl propionate, ethyl propionate, γ-butyrolactone, 2-methyl methoxyacetate, 2-methyl ethoxyacetate, 2-ethyl methoxyacetate, 2-ethyl ethoxypropionate, 2-methoxyethanol, 2-propoxyethanol, 2-butoxyethanol, 1,2-diacetoxyacetone, acetylacetone, diacetone alcohol, methyl alcohol such as methyl acetoacetate or ethyl acetoacetate, ethyl alcohol, isopropyl alcohol, n-butyl alcohol, cyclohexyl alcohol, isobutyl acetate, methyl isobutyl ketone (MIBK), 2-octanone, 2-pentanone, 2-hexanone, ethylene glycol ethyl ether, ethylene glycol isopropyl ether, ethylene glycol butyl ether, propylene glycol methyl ether, ethyl carbitol, butyl carbitol, hexane, heptane, octane, cyclohexane, methylcyclohexane, ethylcyclohexane, benzene, toluene, and xylene. Among these, one kind can be used alone, or two or more kinds can be used in combination.

In addition, as the volatile component which can be changed into a non-volatile component through a chemical reaction, a compound having a low molecular weight among the above-described binder precursors can be preferably used. For example, a polymerizable compound such as methyl (meth)acrylate, ethyl (meth)acrylate, butyl (meth) acrylate or glycidyl methacrylate or cyclohexene oxide can be used. This polymerizable compound can be removed by causing a polymerization reaction to occur after gelling so as to form a non-volatile polymer.

<Binder>

A preferable aspect of the composition according to the present invention is a composition including quantum dots, a binder, and a volatile component. In this aspect, the binder is dissolved in the volatile component, and the quantum dots are dispersed in this solution. As the binder, a well-known polymer which can be formed using a solution film forming method can be used. For example, polyacrylates, polycarbonates, polystyrenes, polyketones, polyether ether ketones, polyesters, polyamides, polyimides, polyacrylamides, polycycloolefins, PVDF, PVC, EVA, polyvinyl alcohols, polyvinyl butyrals, polyvinyl acetals, or cellulose polymers (for example, ethyl cellulose, isopropylmethylcellulose phthalate, nitrocellulose, or cellulose acylate) can be used.

The wavelength conversion film-forming composition according to the present invention is gellable in the presence of the volatile component. In the aspect including the quantum dots, the binder, and the volatile component, the binder itself can function as a gelling agent. As this binder, a binder which can exhibits a gelling ability depending on a thermal stimulus, a concentration change, or a shear force change.

Examples of the binder which exhibits a gelling ability depending on a thermal stimulus include a binder having a lower critical solution temperature (LCST) or an upper critical solution temperature (UCST). Examples of an aspect including the binder include a first preferable aspect of the composition according to the present invention.

In the case of the binder having LCST, a binder solution prepared in a state which is stable as a solution is heated. In addition, in the case of the binder having UCST, a binder solution prepared in a state which is stable as a solution is cooled. As a result, the solution state of the binder cannot be maintained, binder particles can be bonded to each other to form a gel through an interaction stronger than solvation.

Examples of the polymer include celluloses, cellulose acylates, polyvinyl butyrals, polyvinyl alcohols, polymethyl (meth)acrylates or polystyrenes modified with a highly polar group such as a carboxylic acid group or a hydroxyl group, polyacrylonitriles, copolymers thereof, polycycloolefins modified with a highly polar group such as a carboxylic acid group or a hydroxyl group, and polyvinyl ethers having a bulky hydrophobic group and a hydrophilic group.

Among these, in a preferable aspect, the polymer having UCST is used as the binder. As the polymer having UCST, cellulose acylate and/or polyvinyl alcohol is preferably used. In a preferable aspect of cellulose acylate, cellulose acetate is dissolved in dichloromethane or acetone. In addition, in a preferable aspect of polyvinyl alcohol, polyvinyl alcohol is dissolved in water or methanol.

For example, an example of dissolving cellulose acetate in dichloromethane will be described, cellulose acetate is dissolved in dichloromethane, and quantum dots are dispersed therein to prepare a composition. This composition is caused to gel using a cooling casting method. As a result, a self-supporting film-shaped molded body including the volatile component can be obtained. The fluidity of the composition in the gel state is extremely low. Therefore, even in a case where the composition is condensed due to the removal of the volatile component, the wavelength conversion film can be formed without aggregation of the quantum dots.

In the first preferable aspect, the volatile component can be used after adjusting the kind thereof, a solution concentration, or a temperature such that the polymer exhibits USCT or LCST.

In addition, in another aspect, a binder which functions as a gelling agent is not used as the binder, and a binder precursor or a gelling agent described below may be added separately.

<Binder Precursor>

A preferable aspect of the composition according to the present invention is a composition including quantum dots, a binder precursor, and a volatile component. In this aspect, the binder precursor is dissolved or compatibilized in the volatile component, and the quantum dots are dispersed in this solution. As described above, the binder precursor is a collective term for compounds which can form a binder through chain polymerization, condensation, or the like. In particular, in a case where chain polymerization is used, general compounds called polymerizable monomers are binder precursors. Examples of the binder precursor which can form a binder through chain polymerization include a radically polymerizable compound and a cationically polymerizable compound.

The wavelength conversion film-forming composition according to the present invention is gellable in the presence of the volatile component. In the aspect including the binder precursor, the binder precursor itself can function as a gelling agent. The binder precursor functioning as a gelling agent represents that the binder precursor can be converted into a binder so as to cause the composition of according to the present invention to gel by performing photopolymerization by light irradiation or thermal polymerization by heat application in the presence of the volatile component. For example, in a case where the binder precursor is a polymerizable compound (monomer), a high-molecular-weight component is produced in the composition by polymerizing the monomer in the presence of the volatile component such that the viscosity of the composition increases. As a result, the composition gels.

The reaction rate of the monomer in the gel film obtained by gelling can be appropriately adjusted. Only a small amount of the monomer may be used, or the polymerizable monomer may be completely consumed, that is, the entire amount thereof may be converted into a binder. The reaction rate of the polymerizable monomer described herein refers the percentage of the amount of unreacted functional groups remaining after the reaction with respect to the amount of all the functional groups remaining in the polymerizable monomer of the composition before the reaction. For example, in the case of (meth)acrylate, this value can be measured by tracing a change in the peak intensity of a wavelength assigned to a (meth)acryl group in FT-IR. Using a functional group staining technique, the amount of the remaining unreacted functional groups may be determined based on the staining concentration.

In addition, in another aspect, the binder precursor does not function as a gelling agent, and one of the polymers which functions as a gelling agent other than the binder precursor, or another gelling agent described below may be added separately for gelling.

(Radically Polymerizable Compound)

Examples of the radically polymerizable compound include (meth)acrylates, vinyl ethers, and vinyl esters. From the viewpoint of a high reaction rate, (meth)acrylates are preferable. As specific examples of the (meth)acrylates, from the viewpoint of transparency and adhesiveness of the cured coating film, a (meth)acrylate compound such as a monofunctional or polyfunctional (meth)acrylate monomer or a polymer or prepolymer thereof is preferable. In addition, from the viewpoint of suppressing curing shrinkage, a monofunctional (meth)acrylate is more preferable.

—Monofunctional (Meth)Acrylate—

As the monofunctional (meth)acrylate monomer, for example, acrylic acid, methacrylic acid, or a derivative thereof can be used. More specifically, a monomer having one polymerizable unsaturated bond ((meth)acryloyl group) of (meth)acrylic acid in the molecule can be used. Examples of the monofunctional (meth)acrylate monomer include:

an alkyl (meth)acrylate with an alkyl group having 1 to 30 carbon atoms such as methyl (meth)acrylate, n-butyl (meth)acrylate, isobutyl (meth)acrylate, 2-ethylhexyl (meth)acrylate, isononyl (meth)acrylate, n-octyl (meth)acrylate, lauryl (meth)acrylate, or stearyl (meth)acrylate; an aralkyl (meth)acrylate with an alkyl group having 7 to 20 carbon atoms such as benzyl (meth)acrylate or phenoxy (meth)acrylate; an alkoxyalkyl (meth)acrylate with an alkoxyalkyl group having 2 to 30 carbon atoms such as butoxyethyl (meth)acrylate; an aminoalkyl (meth)acrylate with a (monoalkyl or dialkyl)aminoalkyl group having 1 to 20 carbon atoms in total such as N,N-dimethylaminoethyl (meth)acrylate; a polyalkylene glycol alkyl ether (meth)acrylate with an alkylene chain having 1 to 10 carbon atoms and a terminal alkyl ether having 1 to 10 carbon atoms such as diethylene glycol ethyl ether (meth)acrylate, triethylene glycol butyl ether (meth)acrylate, tetraethylene glycol monomethyl ether (meth)acrylate, hexaethylene glycol monomethyl ether (meth)acrylate, octaethylene glycol monomethyl ether (meth)acrylate, nonaethylene glycol monomethyl ether (meth)acrylate, dipropylene glycol monomethyl ether (meth)acrylate, heptapropylene glycol monomethyl ether (meth)acrylate, or tetraethylene glycol monoethyl ether (meth)acrylate; a polyalkylene glycol aryl ether (meth)acrylate with an alkylene chain having 1 to 30 carbon atoms and a terminal aryl ether having 6 to 20 carbon atoms such as hexaethylene glycol phenyl ether (meth)acrylate; a (meth)acrylate having an alicyclic structure and having 4 to 30 carbon atoms in total such as cyclohexyl (meth)acrylate, dicyclopentanyl (meth)acrylate, isobornyl (meth)acrylate, or a methylene oxide adduct of cyclodecatriene (meth)acrylate; a fluorinated alkyl(meth)acrylate having 4 to 30 carbon atoms in total such as heptadecafluorodecyl (meth)acrylate; a (meth)acrylate having a hydroxyl group such as 2-hydroxyethyl (meth)acrylate, 3-hydroxypropyl (meth)acrylate, 4-hydroxybutyl (meth)acrylate, triethylene glycol mono (meth)acrylate, tetraethylene glycol mono(meth)acrylate, hexaethylene glycol mono(meth)acrylate, octapropylene glycol mono(meth)acrylate, or glycerol mono(meth)acrylate or di(meth)acrylate; a (meth)acrylate having a glycidyl group such as glycidyl (meth)acrylate; a polyethylene glycol mono(meth)acrylate with an alkylene chain having 1 to 30 carbon atoms such as tetraethylene glycol mono(meth)acrylate, hexaethylene glycol mono(meth)acrylate, or octapropylene glycol mono(meth)acrylate; and a (meth)acrylamide such as (meth)acrylamide, N,N-dimethyl (meth)acrylamide, N-isopropyl (meth)acrylamide, 2-hydroxyethyl (meth)acrylamide, or acryloylmorpholine.

From the viewpoint of adjusting the viscosity of the mixture to be in a preferable range, the amount of the monofunctional (meth)acrylate monomer used is preferably 10 parts by mass or more and more preferably 10 to 90 parts by mass with respect to 100 parts by mass of the total mass of the composition according to the present invention.

—Bifunctional (Meth)Acrylate—

A bifunctional (meth)acrylate is preferable from the viewpoint of reducing the viscosity of the composition. In the composition according to the present invention, a (meth)acrylate compound having excellent reactivity and having no problem of a residual catalyst or the like is preferable.

Preferable examples of the bifunctional (meth)acrylate include neopentyl glycol di(meth)acrylate, 1,9-nonanediol di(meth)acrylate, dipropylene glycol di(meth)acrylate, tripropylene glycol di(meth)acrylate, tetraethylene glycol di(meth)acrylate, hydroxypivalic acid neopentyl glycol di(meth)acrylate, polyethylene glycol di(meth)acrylate, dicyclopentenyl (meth)acrylate, dicyclopentenyloxyethyl (meth)acrylate, and dicyclopentanyl di(meth)acrylate.

The amount of the bifunctional (meth)acrylate monomer used is preferably 5 parts by mass or more from the viewpoint of adjusting the viscosity of the mixture to be in a preferable range and is preferably 20 parts by mass or less from the viewpoint of suppressing curing shrinkage with respect to 100 parts by mass of the total mass of the composition according to the present invention.

—Trifunctional (Meth)Acrylate—

A trifunctional or higher (meth)acrylate is preferable from the viewpoint of imparting mechanical strength. In the composition according to the present invention, a (meth)acrylate compound having excellent reactivity and having no problem of a residual catalyst or the like is preferable.

Specifically, ECH (epichlorohydrin)-modified glycerol tri(meth)acrylate; EO (ethylene oxide)-modified glycerol tri(meth)acrylate. PO (propylene oxide)-modified glycerol tri(meth)acrylate, pentaerythritol triacrylate, pentaerythritol tetraacrylate, EO-modified phosphoric acid triacrylate, trimethylolpropane tri(meth)acrylate, caprolactone-modified trimethylolpropane tri(meth)acrylate, EO-modified trimethylolpropane tri(meth)acrylate, PO-modified trimethylolpropane tri(meth)acrylate, tris(acryloxyethyl)isocyanurate, dipentaerythritol hexa(meth)acrylate, dipentaerythritol penta(meth)acrylate, caprolactone-modified dipentaerythritol hexa(meth)acrylate, dipentaerythritol hydroxy enta(meth)acrylate, alkyl-modified dipentaerythritol penta(meth)acrylate, dipentaerythritol poly(meth)acrylate, alkyl-modified dipentaerythritol tri(meth)acrylate, ditrimethylolpropane tetra(meth)acrylate, pentaerythritol ethoxy tetra(meth)acrylate, or pentaerythritol tetra(meth)acrylate is preferable.

Among these, EO-modified glycerol tri(meth)acrylate, PO-modified glycerol tri(meth)acrylate, trimethylolpropane tri(meth)acrylate, EO-modified trimethylolpropane tri(meth)acrylate. PO-modified trimethylolpropane tri(meth)acrylate, dipentaerythritol hexa(meth)acrylate, dipentaerythritol penta(meth)acrylate, pentaerythritol ethoxy tetra(meth)acrylate, or pentaerythritol tetra(meth)acrylate is more preferable in the present invention.

The wavelength conversion film-forming composition according to the present invention can include a solvent as the volatile component, and the solvent can be removed after the formation of the film. Therefore, even a highly functional radically polymerizable compound can be preferably used by appropriately adjusting the solubility during solution preparation and the viscosity during coating using a solvent, the highly functional radically polymerizable compound being limited in the amount used and not capable of being used in a composition where coating and curing are performed in the absence of a solvent due to problems in the solubility during solution preparation and the viscosity during coating.

Examples of the highly functional radically polymerizable compound include a (meth)acrylate compound having a structure which exhibits aggregating properties, for example, an isocyanuric group, a urethane group, a urea group, an amido group, an imido group, or a hydroxyl group.

Examples of the (meth)acrylate compound having an isocyanuric group include: A-9300 (trade name; tris(2-acryloxyethyl) isocyanurate) and A9300-ICL (trade name; ε-caprolactone-modified tris(2-acryloxyethyl) isocyanurate) manufactured by Shin-Nakamura Chemical Co., Ltd.; and ARONIX M-313 and M-315 (trade names; isocyanuric acid EO-modified di- and triacrylate) manufactured by Toagosei Co., Ltd.

As the (meth)acrylate compound having a urethane group, a reaction product of a bifunctional or higher isocyanate and a bifunctional or higher alcohol which includes a hydroxyl group at a terminal modified with a (meth)acryloyl group can be used. As the bifunctional or higher isocyanate, for example, toluene diisocyanate, xylylene diisocyanate, diphenylmethane diisocyanate, hexamethylene diisocyanate, isophorone diisocyanate, tetramethylxylylene diisocyanate, or hydrogenated diphenylmethane diisocyanate, can be used. As the bifunctional or higher alcohol, for example, alkylene glycol having 2 to 30 carbon atoms, polyalkylene glycol having a repeated structure of alkylene glycol having 2 to 30 carbon atoms, bisphenol A, an ethylene oxide adduct or a propylene oxide adduct of bisphenol A, polyester polyols having a terminal hydroxyl group, trifunctional or higher polyols such as glycerol, trimethylolpropane, pentaerythritol, or dipentaerythritol, or an ethylene oxide adduct or propylene oxide adduct thereof can be used. Examples of commercially available products of the bifunctional or higher alcohol include: U-2PPA, U-6LPA, U-10HA, U-10PA, UA-1100H, U-15HA, UA-53H, UA-33H, U-200PA, UA-160TM, UA-290TM, UA-4200, and UA-4400, UA-122P (trade names; manufactured by Shin-Nakamura Chemical Co., Ltd.); ARONIX M-1100 and M-1200 (trade names, manufactured by Toagosei Co., Ltd.); and AH-600, UA-306H, UA-306T, UA-306I, UA-510H, UF-8001G, DAUA-167 (trade names; manufactured by Kyoeisha Chemical Co., Ltd.).

In addition, examples of the (meth)acrylate compound having a hydroxyl group include EO-modified glycerol di(meth)acrylate, PO-modified glycerol di(meth)acrylate, trimethylolpropane di(meth)acrylate, EO-modified trimethylolpropane di(meth)acrylate, PO-modified trimethylolpropane di(meth)acrylate, dipentaerythritol penta(meth)acrylate, pentaerythritol ethoxy tetra(meth)acrylate, pentaerythritol tri(meth)acrylate, 2-hydroxy-3-phenoxypropyl acrylate, and a terminal adduct of bisphenol A diglycidyl ether and (meth)acrylic acid. Examples of a commercially available product of the (meth)acrylate compound having a hydroxyl group include EPOXY ESTER M-600A, 40EM, 70PA, 200PA, 80MFA, 3002M(N), 3002A(N), 3000MK, 3000A, and EX-0205 (trade names; manufactured by Kyoeisha Chemical Co., Ltd.).

In addition, as the highly functional radically polymerizable compound, for example, an oligomer type or prepolymer type (meth)acrylate having an average molecular weight of 700 or higher, or an acrylic polymer or a vinyl polymer pendanted with a (meth)acryloyl group or a (meth)acrylate group can also be preferably used.

In terms of a repeating structure forming a main skeleton, examples of the oligomer type or prepolymer type (meth)acrylate include a polyester type, a polyether type, a polyurethane type, an epoxy type, a polybutadiene type, and a polysilicone type. In this specification, a (meth)acrylate having a molecular weight of 700 to 3000 refers to an oligomer type or prepolymer type (meth)acrylate, and a (meth)acrylate having a molecular weight of 3000 or higher refers to a polymer type (meth)acrylate. By using the oligomer type or prepolymer type (meth)acrylate, or the polymer type (meth)acrylate, warping or deformation of the wavelength conversion film caused by a reduction in polymerization shrinkage, or destruction caused by internal stress can be suppressed, and a function corresponding to properties of the repeating structure forming the main skeleton can be imparted.

The polyester type has, for example, a structure represented by the following formula.

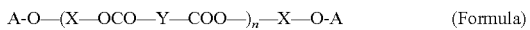

A-O—(X—OCO—Y—COO—)$_n$—X—O-A     (Formula)

(in the formula, n represents 2 to 30 as an average polymerization degree, A represents a (meth)acryloyl group, and X and Y each independently represent an alkylene group having 1 to 18 carbon atoms, an aromatic group having 6 to 18 carbon atoms, or an alkylene group having 2 to 18 carbon atoms and an ether bond.)

In the formula, a configuration of polyester including a linear repeating structure has been described. However, by providing a branch in the structures X and Y of the formula, a branched structure having a trifunctional or higher acryloyl group may be provided.

The polyether type has, for example, a structure represented by the following formula.

A-O—(X—O)$_n$-A     (Formula)

(in the formula, n represents 2 to 30 as an average polymerization degree, A represents a (meth)acryloyl group, and X and Y each independently represent an alkylene group having 1 to 18 carbon atoms, an aromatic group having 6 to 18 carbon atoms, or a mixture thereof)

In the formula, a configuration of polyether including a linear repeating structure has been described. However, by providing a branch in a part of the structures X of the formula, a branched structure having a trifunctional or higher acryloyl group may be provided.

The polyurethane type has, for example, a structure represented by the following formula.

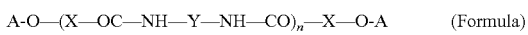

A-O—(X—OC—NH—Y—NH—CO)$_n$—X—O-A     (Formula)

(in the formula, n represents 2 to 30 as an average polymerization degree, A represents a (meth)acryloyl group, and X and Y each independently represent an alkylene group having 1 to 18 carbon atoms, an aromatic group having 6 to 18 carbon atoms, or an alkylene group having 2 to 18 carbon atoms and an ether bond.)

In the formula, a configuration of polyurethane including a linear repeating structure has been described. However, by providing a branch in a part of the structures X and Y of the formula, a branched structure having a trifunctional or higher acryloyl group may be provided.

The details of various kinds of oligomer type or prepolymer type (meth)acrylates, or polymer type (meth)acrylates including not only the polyester type, the polyether type and the polyurethane type described above but also an epoxy type, a polybutadiene type, and a polysilicone type can be found in the description of "Development of Ultraviolet and Electron Beam Curable Materials" (popular edition, CMC Publishing Co., Ltd., 2003). Among the structure represented by the above-described formulae, a functional (meth)acrylate may be configured to have a structure having structural features of only one formula, or may be configured to have a structure having features of a plurality of formulae.

The oligomer type or prepolymer type (meth)acrylate, or the polymer type (meth)acrylate may have a linear molecular structure as described above, or may have a branched structure. In particular, a type having a significantly large number of branches and a long chain length is called "hyperbranched type" or "dendrimer type", and this type does not cause an increase in the viscosity of a coating solution, and exhibits high cohesive force and excellent properties of a cured product. From these viewpoints, the "hyperbranched type" or "dendrimer type" is preferably used as the binder precursor according to the present invention. As this hyperbranched polymer type (meth)acrylate, for example, "STAR-501" (trade name; manufactured by Osaka Organic Chemical Industry Ltd.) can be preferably used.

The amount of the polyfunctional (meth)acrylate monomer used is preferably 5 parts by mass or more from the viewpoint of increasing the coating film strength of the quantum dot-containing layer after curing and is preferably 20 parts by mass or less from the viewpoint of suppressing curing shrinkage with respect to 100 parts by mass of the total mass of the composition according to the present invention.

(Cationically Polymerizable Compound)

Preferable examples of the cationically polymerizable compound include an epoxy compound such as oxiranes or oxetanes.

—Epoxy—

Examples of the epoxy compound include polyglycidyl esters of polybasic acids, polyglycidyl ethers of polyols, polyglycidyl ethers of polyoxyalkylene glycos, polyglycidyl ethers of aromatic polyols, hydrogenated polyglycidyl ether compounds of aromatic polyols, urethane-polyepoxy compounds, and epoxidized polybutadienes. Among these compounds, one kind can be used alone, and a mixture of two or more kinds can be used.

Other examples of the epoxy compound which can be preferably used include: an aliphatic cyclic epoxy compound, bisphenol A diglycidyl ether, bisphenol F diglycidyl ether, bisphenol S diglycidyl ether, brominated bisphenol A diglycidyl ether, brominated bisphenol F diglycidyl ether, brominated bisphenol S diglycidyl ether, hydrogenated bisphenol A diglycidyl ether, hydrogenated bisphenol F diglycidyl ether, hydrogenated bisphenol S diglycidyl ether, 1,4-butanediol diglycidyl ether, 1,6-hexanediol diglycidyl ether, glycerin triglycidyl ether, trimethylolpropane triglycidyl ether, polyethylene glycol diglycidyl ether, and polypropylene glycol diglycidyl ether; polyglycidyl ethers of polyether polyols obtained by adding one alkylene oxide or two or more alkylene oxides to an aliphatic polyol such as ethylene glycol, propylene glycol, or glycerin; diglycidyl esters of aliphatic long-chain dibasic acids; monoglycidyl ethers of aliphatic higher alcohols; monoglycidyl ethers of phenol, cresol, butyl phenol, or polyether alcohols obtained by adding an alkylene oxide to phenol, cresol, or butyl phenol; and glycidyl esters of higher fatty acids.

Among these components, an aliphatic cyclic epoxy compound, bisphenol A diglycidyl ether, bisphenol F diglycidyl ether, hydrogenated bisphenol A diglycidyl ether, hydrogenated bisphenol F diglycidyl ether, 1,4-butanediol diglycidyl ether, 1,6-hexanediol diglycidyl ether, glycerin triglycidyl ether, trimethylolpropane triglycidyl ether, neopentyl glycol diglycidyl ether, polyethylene glycol diglycidyl ether, or polypropylene glycol diglycidyl ether is preferable.

Examples of a commercially available product which is preferably used as the compound having an epoxy group or an oxetanyl group include: 828US (manufactured by Mitsubishi Chemical Corporation); UVR-6216 (manufactured by Union Carbide Corporation); GLYCIDOL, AOEX 24, CYCLOMER (registered trade name) A200, CELLOXIDE (registered trade name) 2021P, and CELLOXIDE 8000, (all of which are manufactured by Daicel Corporation); 4-vinylcyclohexene dioxide (manufactured by Sigma-Aldrich Co. LLC.), EPIKOTE (registered trade name) 828, EPIKOTE 812, EPIKOTE 1031, EPIKOTE 872, and EPIKOTE CT 508 (all of which are manufactured by Mitsubishi Chemical Corporation); and KRM-2400, KRM-2410, KRM-2408, KRM-2490, KRM-2720, and KRM-2750 (all of which are manufactured by Adeka Corporation). Among these, one kind can be used alone, or two or more kinds can be used in combination.

In addition, the compound having an epoxy group or an oxetanyl group can be prepared without any particular limitation in the preparation method with reference to, for example, "The Fourth Series of Experimental Chemistry, 20 Organic Synthesis II, pp. 213" (Maruzen-Yushodo Co., Ltd., 1992), "The Chemistry of Heterocyclic Compounds—Small Ring Heterocycles, Part 3 Oxiranes" (Ed. by Alfred Hasfner, John Wiley and Sons, An Interscience Publication, New York, 1985), "Adhesion, Vol. 29, No. 12, 32" (Yoshimura, 1985), "Adhesion, Vol. 30, No. 5, 42" (Yoshimura, 1986), "Adhesion, Vol. 30, No. 7, 42" (Yoshimura, 1986), JP1999-100378A (JP-H11-100378A), JP2906245B, and JP2926262B.

(Polymerization Initiator)

In order to polymerize the polymerizable monomer, a polymerization initiator can be added. The polymerization initiator may be a photopolymerization initiator or a thermal polymerization initiator.

Regarding the photopolymerization initiator, examples of IRGACURE (registered trade name) series which is commercially available from BASF SE include IRGACURE 290, IRGACURE 651, IRGACURE 754, IRGACURE 184, IRGACURE 2959, IRGACURE 907, IRGACURE 369, IRGACURE 379, and IRGACURE 819. In addition, examples of DAROCURE (registered trade name) include DAROCURE TPO and DAROCURE 1173. In addition, examples of ESACURE (registered trade name) which is commercially available from Lamberti S.p.A. include ESACURE TZM, ESACURE TZT, and ESACURE KTO46. In addition, the first polymerizable composition may include a well-known radical polymerization initiator or a well-known cationic polymerization initiator. For example, the details can be found in paragraph "0037" of JP2013-043382A and paragraphs "0040" to "0042" of JP2011-159924A.

The content of the photopolymerization initiator is preferably 0.1 to 10 parts by mass, more preferably 0.2 to 8 parts by mass, and still more preferably 0.2 to 5 parts by mass with respect to 100 parts by mass of the first polymerizable composition.

A second preferable aspect of the composition according to the present invention is a composition including quantum dots, a volatile component, a binder precursor that is soluble or compatible in the volatile component, and a polymerization initiator of the binder precursor, in which the composition is caused to gel by polymerizing at least a part of the binder precursor.

In the second preferable aspect, the composition according to the present invention may further include a solvent. The kind and addition amount of the solvent are not particularly limited. For example, as the solvent, one organic solvent or a mixture of two or more organic solvents may be used. In addition, the polymerizable compound may be activated and polymerized using a method such as energy ray irradiation instead of adding the polymerization initiator.

In addition, in the second preferable aspect, it is preferable that the composition further includes the above-described binder, and it is more preferable that the composition further includes a thixotropy imparting agent shown below as a gelling agent.

<Other Gelling Agent>

The composition according to the present invention may include another gelling agent other than the above-described compounds. A third preferable aspect of the composition according to the present invention is a composition including a thixotropy imparting agent as the other gelling agent. The thixotropy imparting agent refers to a material which has a function of imparting thixotropy to a liquid composition when added to the liquid composition. In this specification, thixotropy refers to a property in which the viscosity of the composition decreases during shearing and slowly increases in a stationary state such that the composition gels. The reason for this action is as follows. During shearing, an interaction network between particles of the thixotropy imparting agent gradually breaks and cannot be formed again, and finally this interaction is completely lost in the end. On the other hand, in a stationary state, an interaction network between particles of the thixotropy imparting agent is slowly formed, and finally the formed network continuously maintains a high viscosity as long as it is not broken again by strong shearing. Therefore, the composition is in a sol state while being stirred in a period from liquid preparation to coating or while flowing in a pipe or in a die, and is in a gel state while being in a stationary state after applied to a support or the like.

Accordingly, in the third preferable aspect of the composition according to the present invention, the composition can be caused to gel by leaving it to stand for a predetermined period of time after coating. The viscosity of this material largely varies depending on measurement conditions or measurement time. Therefore, it is necessary to set conditions for measuring the viscosity to be different from other gelling materials. In an example of a method of measuring the viscosity of the material in the present invention, the viscosity in the flowing state is measured using a rotary viscometer at a shear rate of 500 $[s^{-1}]$, and the viscosity in the stationary state is measured using a rotary viscometer at a shear rate of 1 $[s^{-1}]$. That is, gelling properties suitable for the composition according to the present invention can be obtained by adjusting the viscosity measured at a shear rate of 500 $[s^{-1}]$ to be lower than 200 Pa·s and adjusting the viscosity measured at a shear rate of 1 $[s^{-1}]$ to be 200 Pa·s or higher.

Specific examples of the thixotropy imparting agent include: inorganic particles such as fumed silica, alumina, silicon nitride, titanium dioxide, calcium carbonate, zinc oxide, talc, mica, feldspar, kaolinite (kaolin clay), pyrophyllite (pyrophyllite clay), sericite, bentonite, smectite and vermiculite (for example, montmorillonite, beidellite, nontronite, or saponite), organic bentonite, or organic smectite; a modified product of the inorganic particles; an organic polymer such as carboxymethyl cellulose, methyl cellulose, hydroxyethyl cellulose, modified polyvinyl alcohol, polyvinyl pyrrolidone, an alginate, a polyacrylate, a partial ester of a vinyl ethyl ether-maleic anhydride copolymer, or xanthane gum; and organic surface-modified particles in which surfaces of organic polymer particles such as swelling resin particles, fluororesin particles, or silicone resin particles, which are obtained by partially crosslinking the above organic polymer to become insoluble, have a graft chain; a crystalline polymer microstructure such as cellulose nanoparticles.

Examples of the other gelling agent other than the thixotropy imparting agent include a material which does not exhibit gelling ability alone and reacts with the binder or the binder precursor having no gelling ability to form a non-covalent interaction or to form a covalent bond such that the composition is caused to gel. A compound having the above-described action can be selected depending on the kind of the binder or the binder precursor. For example, in a case where the binder is a compound having a hydroxyl group such as cellulose acetate or polyvinyl alcohol, a bifunctional or higher isocyanate compound or block isocyanate compound, a metal alkoxide compound, a boric acid compound is preferable as the gelling agent exhibiting the gelling function.

<Other Functional Additives>

Optionally, the other functional additives can be added to the composition according to the present invention. Examples of the additives include: a surface energy adjuster such as a specific gravity adjuster, a leveling agent, or an antifoaming agent; an UV absorber for obtaining a desired fluorescence emission spectrum such as an antioxidant for preventing deterioration caused by long-term light irradiation, a radical scavenger, a water gettering agent, or an oxygen gettering agent; a dispersing auxiliary agent for assisting dispersion of a phosphor such as a visible light absorber or an IR absorber; a refractive index regulator for regulating optical characteristics of the molded body such as a micellizing agent, a plasticizer for adjusting mechanical properties and surface properties of the obtained molded body, a brittleness improver, an adhesiveness improver, an antistatic agent, an antifouling agent, or a filler; and a light scattering agent.

Figure 2:
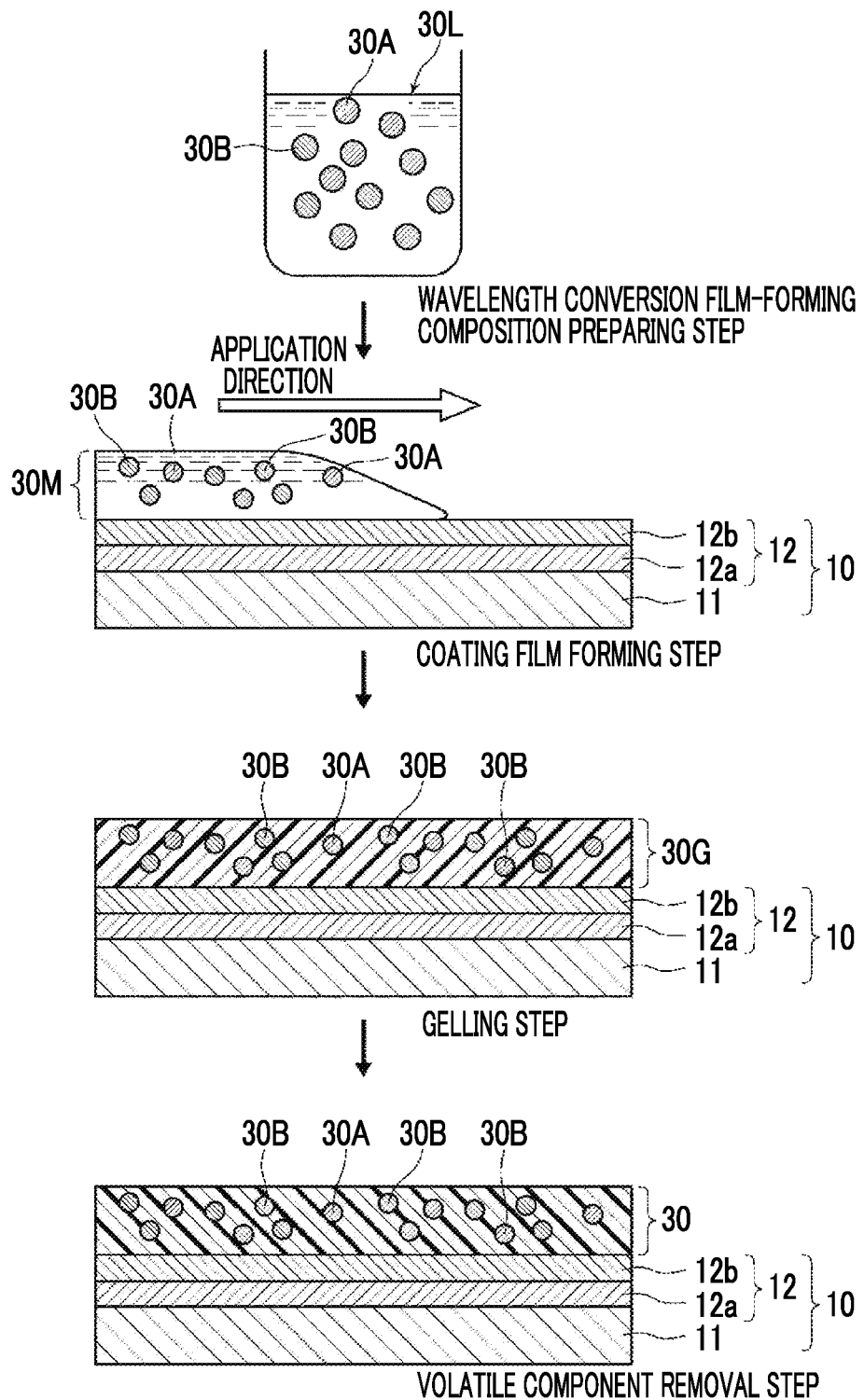
FIG. 2 is a flowchart schematically showing a second preferable aspect of the method of manufacturing a wavelength conversion film according to the present invention.

[Wavelength Conversion Film and Method of Manufacturing Wavelength Conversion Film] The wavelength conversion film-forming composition according to the present invention is preferably used in a method of manufacturing a wavelength conversion film according to the present invention. The method of manufacturing a wavelength conversion film according to the present invention will be described with reference to the drawings. FIG. 1 is a flowchart schematically showing a first preferable aspect of a method of manufacturing a wavelength conversion film according to the present invention. FIG. 2 is a flowchart schematically showing a second preferable aspect of the method of manufacturing a wavelength conversion film according to the present invention. In the drawings of this specification, dimensions of respective portions are appropriately changed in order to easily recognize the respective portions.

As shown in FIGS. 1 and 2, the method of manufacturing a wavelength conversion film according to the present invention is a method of manufacturing the wavelength conversion film 30 including at least one kind of quantum dots that are excited by excitation light to emit fluorescence and are dispersed in an organic matrix, the method sequentially including:

a wavelength conversion film-forming composition preparing step of preparing a wavelength conversion film-forming composition 30L including quantum dots 30A and 30B according to the present invention;

a coating film forming step of forming a coating film 30M of the wavelength conversion film-forming composition 30L by applying the wavelength conversion film-forming composition 30L to a substrate 10:

a gelling step of forming a gel film 30G including the volatile component by performing at least one treatment of a cooling treatment, a heating treatment, a light irradiation treatment, an energy ray irradiation treatment, or a shear force changing treatment on the coating film 30M so as to cause the coating film 30M to gel; and a volatile component removal step of removing the volatile component from the gel film 30G.

In FIGS. 1 and 2, the quantum dots 30A and 30B are the above-described quantum dots (A) and (B). In addition, in this aspect, a barrier film 10 which is preferable as a substrate of a wavelength conversion member 1D described below is used as the substrate 10. The barrier film 10 includes an inorganic barrier film 12a and an organic barrier film 12b on a substrate 11. FIGS. 1 and 2 show the aspect in which the composition according to the present invention is formed directly on the barrier film 10 by using the barrier film 10 as the substrate for forming the composition. However, the present invention is not limited to this composition. In the description of an example below of the method of manufacturing a wavelength conversion film, a metal support is used as the substrate. In this case, the wavelength conversion film is manufactured by peeling the gel film or the wavelength conversion film from the metal support after the formation and then adhering the gel film or the wavelength conversion film to the barrier film 10.

FIG. 1 shows the aspect in which the gelling step is performed through any one of a cooling treatment, a heating treatment, a light irradiation treatment, and an energy ray irradiation treatment. FIG. 2 shows the aspect in which the gelling step is performed through a shear force changing treatment (coating).

Hereinafter, the respective steps will be described in detail.

<Wavelength Conversion Film-Forming Composition Preparing Step>

The preparation (liquid preparation) of the wavelength conversion film-forming composition according to the present invention can be performed using an ordinary method. A method of mixing the raw materials is not particularly limited. For example, the raw materials may be stirred and mixed using a mixing tank or the like, or may be stirred and mixed in a liquid supply line using a static mixer.

From the viewpoints of hygroscopicity of the raw materials and effects of oxygen and water in the raw materials on the gelling step, it is preferable that liquid preparation, and storage and liquid supply after the liquid preparation are performed in a dry inert gas atmosphere, for example, are performed using an air-tight tank such as an air-tight automated liquid preparation device (trade name: POSIRATIO; manufactured by Liquid Control Corporation (USA)). As the inert gas, nitrogen gas or argon is preferably used. From the viewpoint of inexpensiveness, nitrogen gas is more preferable. The oxygen concentration in the inert gas used is preferably 0.5 volume ppm or lower, more preferably 0.2 volume ppm or lower, and still more preferably 0.1 volume ppm or lower. In addition, the dew point of the inert gas used is preferably −65° C. or lower, more preferably −70° C. or lower, and still more preferably −80° C. or lower.

In addition, in the second preferable aspect of the composition according to the present invention including the binder precursor and the polymerization initiator, a reaction progresses gradually simply by mixing the binder precursor and the polymerization initiator with each other, and heat of reaction generated at this time further accelerates the reaction unintentionally. Accordingly, in this configuration, it is preferable that the unintentional progress of the reaction is suppressed in advance by cooling before coating. It is necessary to carefully set a cooling temperature such that the dispersed quantum dots or the added various functional additives do not aggregate or precipitate during cooling. In addition, in a case where a material which gels during cooling is used, it is preferable that the storage temperature as the cooling temperature is set to be higher than the gelling temperature by 1° C. to 2° C. such that gelling does not occur, or it is preferable that the composition is stored at the gelling temperature or lower and is released from the gel state by heating, stirring, or crushing with ultrasonic waves or shaking immediately before use.

<Coating Film Forming Step>

Next, the prepared wavelength conversion film-forming composition according to the present invention is applied to the substrate to form a coating film of the wavelength conversion film-forming composition. The composition according to the present invention can be applied using various well-known coating methods. Examples of the various coating methods include a curtain coating method, a dip coating method, a spin coating method, a printing coating method, a spray coating method, a slot coating method, a roll coating method, a slide coating method, a blade coating method, a gravure coating method, and a wire bar method.

The coating method can be selected from the above-described methods depending on properties of the composition used. For example, the composition according to the present invention including the thixotropy imparting agent gels due to a change in the shear state, specifically, a change from a strong shear state to a stationary state. Therefore, a coating method of applying a high shear force to a coating solution, for example, a slot coating method, a roll coating method, or a wire bar coating method is preferably used.

As the substrate to which the composition according to the present invention is applied, various well-known substrates can be used. In a case where the substrate to which the composition according to the present invention is applied to form the coating film thereon is used as a component of the wavelength conversion member, the substrate can be used as the substrate of the wavelength conversion member described below. In addition, this same is not applicable to a case where the wavelength conversion member is formed by applying the composition according to the present invention to the substrate to form a coating film thereon, curing the coating film to form a wavelength conversion film, removing the substrate from the wavelength conversion film, and adhering the wavelength conversion film to another substrate.

In addition, in the aspect where the wavelength conversion member is formed by adhering the wavelength conversion film to another substrate, in a case where the wavelength conversion member is sufficiently self-supporting after the gelling step described below, the substrate may be rapidly removed after the gelling step.

The shape of the substrate is not particularly limited and may be a cut sheet shape or an elongated sheet shape. Since the wavelength conversion film can be manufactured using a roll-to-roll method, it is preferable that the shape of the substrate is an elongated sheet shape.

<Gelling Step>

In the gelling step, a gel film including the volatile component is formed by performing at least one treatment of a cooling treatment, a heating treatment, a light irradiation treatment, an energy ray irradiation treatment, or a shear force changing treatment on the coating film formed on the substrate so as to cause the coating film to gel; and In a case where a combination of two or more treatments is performed as the gelling treatment, the respective treatments may be performed sequentially or simultaneously.

The cooling treatment can be realized, for example, by cooling the substrate in advance, by cooling a transport roll in advance which transports the substrate, or by setting a coating zone or a transport zone to be in a cooling atmosphere. The heating treatment can be realized by performing heating instead of cooling in the above-described methods. Further, heating can be performed using radiant heat generated from a heat radiation device such as infrared (IR) heater.

The light irradiation treatment and the energy ray irradiation treatment can be realized by irradiating the coating film (web) with light or energy rays at a desired wavelength using an irradiation device which emits the light or the energy rays. The irradiation dose, irradiation time, and irradiation density may be appropriately adjusted so as to obtain preferable conditions depending on the raw material to be gelled.

Since the coating step itself is a step where the shear state changes, the treatment of changing the shear state can be realized by applying the composition according to the present invention to the substrate using the coating method and subsequently leaving the composition on the substrate to stand for a predetermined period of time such that the composition gels.

<Volatile Component Removal Step>

In the volatile component removal step, the volatile component is removed from the gel film obtained in the gelling step. As a result, the content of the volatile component remaining in the formed wavelength conversion film after this step can be made to be lower than 0.2 mass %. A method of removing the volatile component is not particularly limited. Typically, the volatile component can be removed by volatilization using heating, wind blowing, or the like, or by curing using heating, light irradiation, or energy ray irradiation. In the volatile component removal step, preferably 90 mass % or higher and more preferably 95 mass % or higher of the volatile component is removed from the gel film. In the volatile component removal step, it is preferable that 90 mass % or higher of the volatile component is removed by volatilization from the gel film.

Hereinafter, a preferable aspect of the method of manufacturing a wavelength conversion film according to the present invention will be described.

<First Method of Manufacturing Wavelength Conversion Film: Cooling Gelling Method>

In the first preferable aspect of the method of manufacturing a wavelength conversion film according to the present invention, the wavelength conversion film-forming composition including the binder having the upper critical solution temperature (UCST) is used, and in the gelling step, the gel film is formed by performing the cooling treatment on the coating film (cooling gelling method).

Hereinafter, as an example of the cooling gelling method, a method of manufacturing a wavelength conversion film using the composition according to the present invention, which includes cellulose triacetate as the binder having the upper critical solution temperature (UCST) and includes a mixture of dichloromethane, methanol, and the like as the volatile component, will be described. Using the following method, a wavelength conversion film including at least one kind of quantum dots that are excited by excitation light to emit fluorescence and are dispersed in a cellulose acylate matrix can be manufactured.

As a film forming method and a facility, for example, a solution casting method and a solution casting device which are used to manufacture a cellulose triacetate film in the related art can be used.

First, cellulose triacetate is dissolved in the volatile component including the mixture of dichloromethane and methanol to prepare the composition according to the present invention (hereinafter, referred to as dope) using a dissolving machine (vessel).

The prepared dope is temporarily stored in a storage vessel, bubbles are removed from the dope, and optionally the dope is caused to pass through a filter. Next, the dope is supplied from a dope discharge port to a pressure die using, for example, a pressure type constant volume gear pump which can accurately supply liquid at a constant rate depending on a rotation speed. Next, the dope is uniformly cast on a metal support which is endlessly transported from a slit of the pressure die to a casting portion.

The space temperature of the casting portion is −50° C. to 50° C. and preferably −30° C. to 40° C. The cellulose acylate solution (dope) which is cast at a low space temperature is instantly cooled to gel on the substrate and is held as a gel film including the volatile component. As a result, the gel film (web) which is peelable from the metal support can be formed within a short period of time. Means for cooling the space is not particularly limited and may be ordinary air, or may be nitrogen, argon, helium, or the like. In this case, the humidity is preferably 0% to 70% RH and more preferably 0% to 50% RH.

In addition, the temperature of the metal support in the casting portion is −50° C. to 130° C. and preferably −30° C. to 25° C. In order to maintain the temperature of the casting portion to be in the preferable range of the present invention, cooled gas may be introduced into the casting portion, or the space may be cooled by providing a cooling device in the casting portion. At this time, it is important to pay attention to prevent adherence of water. For example, a method of using dry gas can be adopted.

The viscosity of the wavelength conversion film-forming composition before gelling (before the wavelength conversion film-forming composition, which is supplied from the storage tank to the die, is cast on the metal support) is preferably 1 to 200 Pa·s when measured using a rotary viscometer at a shear rate of 1 $[s^{-1}]$ and is more preferably 30 to 150 Pa·s from the viewpoints of realizing smooth liquid supply and flowing in the die smooth and making a variation in the thickness of the wavelength conversion film in a width direction and a transport direction thereof uniform. In addition, the viscosity of the wavelength conversion film-forming composition after gelling (after the wavelength conversion film-forming composition is cast on the metal support and is cooled) is preferably 200 Pa·s or higher when measured using a rotary viscometer at a shear rate of 1 [s-1] and is more preferably 400 Pa·s or higher from the viewpoints of suppressing flowing in the gel film to prevent aggregation of the quantum dots. The loss elastic modulus measured at a shear rate of 1 $[s^{-1}]$ is preferably 800 pa or higher in the gel state from the viewpoint of transporting the self-supporting film including the volatile component which is peeled off from the substrate, and is more preferably 1200 Pa or higher from the viewpoint of realizing stable transportation.

In addition, regarding the amount of the volatile component (here, which is substantially a mixture of dichloromethane and an alcohol) in the wavelength conversion film-forming composition according to this aspect, the amount of the volatile component in the gel film immediately after the gelling step is preferably 20 to 500 parts by mass and more preferably 30 to 400 parts by mass with respect to 100 parts by mass of the solid content of the binder.

In the casting step, a single dope may be cast, or dopes having different compositions may be co-cast sequentially and/or simultaneously. Examples of a method of co-casting two or more cellulose acylate solutions include: a method of casting and laminating solutions including cellulose acylate from a plurality of casting nozzles which are provided at intervals in a support transport direction (for example, a method described in JP1999-198285A (JP-H11-198285A)); a method of casting cellulose acylate solutions from two casting nozzles (a method described in JP1994-134933A (JP-H6-134933A); and a method of embracing the flow of a high-viscosity cellulose acylate solution with a low-viscosity cellulose acylate solution and simultaneously casting the high-viscosity cellulose acylate solution and the low-viscosity cellulose acylate solution (a method of described in JP1981-162617A (JP-S56-162617A)).

In these methods, the wavelength conversion film-forming composition according to the present invention only has to be used in an amount corresponding to at least one layer, and the objects of the present invention can be achieved as long as the layer of the wavelength conversion film-forming composition can be caused to gel. Accordingly, the other layers are not necessarily caused to gel by cooling, and various well-known polymer solutions which can be used in a solution film forming method can be appropriately used. As a specific embodiment, a case of co-casting and laminating three layers in order of A layer/B layer/C layer will be described. In this case, the B layer may be formed using the wavelength conversion film-forming composition according to the present invention, and the A layer and the C layer may be formed using a dope which does not include quantum dots including cellulose acylate and is gellable by cooling. Alternatively, the B layer may be formed using the wavelength conversion film-forming composition according to the present invention, and the A layer and the C layer may be formed by co-casting a polymer dichloromethane solution such as polymethyl methacrylate which is not gellable.

Next, the web is peeled off from the metal support, and the volatile component removal step is performed by nipping opposite ends of the peeled web with a clip, transporting and drying the web using a tenter while maintaining the width. After completion of the volatile component removal step, the web is wound in a predetermined length using a winder. The modulus of elongation of the gel film during peeling is preferably 1 Mpa or higher and is more preferably 3 MPa or higher form the viewpoint of enduring a transport tension at which a transport speed suitable for productivity can be realized. In addition, during peeling, it is preferable that the volatile component is removed from the metal support using dry air or the like such that the amount of the volatile component is 10 to 200 parts by mass with respect to 100 parts by mass of the binder.

In the volatile component removal step, the drying temperature is 40° C. to 250° C. and preferably 70° C. to 180° C. Further, in order to remove the residual solvent (volatile component), the gel film is dried at 50° C. to 160° C. In this case, it is preferable that the remaining volatile component is volatilized by drying it with high-temperature air whose temperature is sequentially changed. The above-described method is described in JP1993-17844B (JP-H5-17844B). According to this method, the period of time from casting to peeling can be reduced. The drying temperature, dry air flow rate, and drying time vary depending on the solvent used, and can be selected depending on the kind and combination of the solvent used.

After completion of the volatile component removal step, the amount of the volatile component remaining in the wavelength conversion film is preferably lower than 0.2 parts by mass with respect to 100 parts by mass of the wavelength conversion film and more preferably lower than 0.1 parts by mass from the viewpoint of preventing a change in the dimension of the wavelength conversion film caused by volatilization over time, damages of the wavelength conversion film under heating conditions, and damages of the wavelength conversion member including the wavelength conversion film.

In addition, in order to rapidly complete the volatile component removal step, the treatment such as light irradiation may be performed after the formation of the gel film.

In a solution casting method which is used for forming a functional film for an electronic display, in many cases, not only a solution casting device but also a coating device are provided for a surface treatment of a film such as an undercoating layer, an antistatic layer, or a protective layer. The details of the respective manufacturing steps can be found in pp. 25 to 30 of "JIII Journal of Technical Disclosure" (No. 2001-1745, Mar. 15, 2001, Japan Institute for Promoting Invention and Innovation) and can be classified into casting (including co-casting), a metal support, drying, peeling, stretching, and the like.

In addition, in order to impart light scattering properties to the obtained wavelength conversion film, at least a part of the obtained wavelength conversion film may be microporous. As specific means for achieving the above configuration, for example, 0.01 to 1.0 part by mass of a second volatile component may be added with respect to 100 parts by mass of the binder in the wavelength conversion film-forming composition according to the present invention, the second volatile component being a poor solvent with respect to the binder (the second volatile component alone is not soluble in the binder and has a solubility of 0.1 g/L or lower in the binder at 25° C.), having a higher boiling point than the volatile component, and being compatible or soluble in the binder. As a result, in the volatile component removal step, voids are formed in the film due to aggregation in the binder while the second volatile component is being relatively concentrated. Finally; the second volatile component is also removed, and thus micropores can be formed. At this time, in the present invention, this phenomenon occurs in the gel film state. Therefore, the binder cannot flow, the growth of voids is suppressed, only pores having a size of several hundreds of nanometers to several tens of micrometers which is suitable for a light scattering layer can be selectively formed. The porosity, pore size, and pore shape of the wavelength conversion film per unit volume can be set depending on desired light scattering properties. This configuration can be achieved by adjusting the addition amount of the second volatile component and the amount of the volatile component removed per unit time in the volatile component removal step.

<Second Method of Manufacturing Wavelength Conversion Film: Polymerization Method>

In the second preferable aspect of the method of manufacturing a wavelength conversion film according to the present invention, the wavelength conversion film-forming composition includes a binder precursor and a polymerization initiator of the binder precursor, in which in the gelling step, the gel film is formed by performing the heating treatment or the light irradiation treatment on the coating film to polymerize at least a part of the binder precursor.

(Manufacturing Example 1 Using Light Irradiation Gelling Step)

Hereinafter, an example of a manufacturing method using a light irradiation gelling step will be described.

In this method, the composition according to the present invention which can be applied to the light irradiation gelling step includes: an acrylate monomer that is a photopolymerizable binder precursor; a photopolymerization initiator; and butyl acrylate that is a reactive volatile component, in which a wavelength conversion film can be formed in an elongated sheet shape through the light irradiation gelling step in a state where it includes the volatile component.

First, the prepared composition is supplied to a casting die and is applied to a metal drum. Next, the gel film (web) is formed by rapidly polymerizing the acrylate monomer by light irradiation in the gelling step. At this time, in a case where the composition includes 30 mass % or higher of the binder precursor with respect to the total mass of all the components excluding the volatile component, it is preferable that the polymerization reaction is not completed. The polymerization reaction being not completed represents that the amount of remaining polymerizable functional groups which can be measured using the above-described method is 10% or higher. The amount of polymerizable functional groups remaining immediately after the gelling step is preferably 10% to 90%, more preferably 20% to 80%, and still more preferably 25% to 70%. In this configuration, by not completing the polymerization reaction, the molecular structure of the binder forming the layer is loosely maintained, and the volatile component can be efficiently removed in a drying step described below. As described above, the viscosity of the composition after the gelling step at a shear rate of 1 [s⁻¹] is preferably 200 Pa·s or higher, more preferably 400 Pa·s or higher, and still more preferably 1000 Pa·s or higher. In addition, the amount of the volatile component (in the embodiment described herein, butyl acrylate) in the wavelength conversion film-forming composition according to this aspect is preferably 10 to 300 parts by mass and more preferably 20 to 100 parts by mass with respect to 100 parts by mass of the solid content converted into the polymerized binder in the gel film immediately after the gelling step. This value can be determined by collecting the gel film immediately after the gelling step, volatilizing and removing butyl acrylate using an evaporator, and measuring a mass change from the remaining solid content. As described above, a mass change after heating and drying at 180° C. for 1 hour can also be measured. At this time, however, butyl acrylate is thermally polymerized, and a correct value cannot be measured. Therefore, a method of removing butyl acrylate under reduced pressure is preferably used.

A light source for the light irradiation is not particularly limited as long as it emits ultraviolet light, and examples thereof include various mercury lamps such as a ultrahigh-pressure, high-pressure, middle-pressure, or lower pressure mercury lamp, a chemical lamp, a carbon arc lamp, a metal halide lamp, a xenon lamp, and sunlight. Various available laser light sources at a wavelength of 350 to 420 nm can also be used by adopting multi-beam irradiation.

Polymerization by light irradiation can be performed in air or an inert gas atmosphere. However, in a case where a radically polymerizable compound is used, it is preferable that the oxygen concentration in the atmosphere is as low as possible, for example, in order to reduce the polymerization induction period or to sufficiently increase the polymerization ratio. The irradiation intensity of ultraviolet light irradiated is preferably about 0.1 to 100 mW/cm², and the light irradiation dose on the dope film surface is preferably 100 to 1000 mJ/cm². In addition, it is preferable that a temperature distribution in the dope film in the light irradiation step is as uniform as possible. It is preferable that the temperature distribution is controlled to be within ±3° C. and more preferably within ±1.5° C. It is preferable that the polymerization reaction is performed uniformly in the in-plane direction of the dope film and a depth direction in the dope film within the above-described range.

After the gelling step, optionally, the web is peeled off from the metal drum, is transported through the drying zone, and butyl acrylate as the volatile component is volatilized and removed. As a result, the thickness of the wavelength conversion film is reduced, the quantum dot concentration per volume is increased, the fluorescence emission efficiency per unit thickness is improved. Since the high viscosity of the composition is maintained, a preferable emission efficiency can be maintained without aggregation of the quantum dots. The modulus of elongation of the gel film during peeling is preferably 1 Mpa or higher and is more preferably 3 MPa or higher form the viewpoint of enduring a transport tension at which a transport speed suitable for productivity can be realized.

The volatile component removal step is preferably completed by the volatilization removal, but there may be a case where the volatile component removal step is not completed by the volatilization removal. In this case, after the volatilization removal, the web is exposed to light such that butyl acrylate as the remaining volatile component is converted into a non-volatile polymer through a polymerization reaction and removed. As a result, the volatile component removal step can be completed. At this time, butyl acrylate can be incorporated as a part of the binder through the polymerization reaction. The amount of the volatile component remaining after the completion of the volatile component removal step is preferably lower than 0.2 parts by mass, more preferably 0.1 parts by mass, and still more preferably 0.05 parts by mass with respect to 100 parts by mass of the obtained wavelength conversion film.

Further, in order to make the thickness uniform, to impart the tensile strength, to improve brittleness, and to adjust surface properties, for example, a stretching treatment, a width reducing treatment, an annealing treatment, a calendering treatment, a corona treatment, or a light or energy ray irradiation may be performed on the web.

In addition, in the above description, the metal drum is used. However, an endless metal band may be used instead of the metal drum. In addition, instead of the metal drum or the metal band, a drum or a band having a surface coated with a resin or a ceramic may be used, or a drum or a band formed of a resin or a ceramic may also be used. The surface shape of the band or the drum may be smooth. However, in order to improve the fluorescence extraction efficiency from the wavelength conversion film or to impart a light collecting function, a light scattering function, or a collimating function, an uneven surface shape which is appropriately designed to transfer the shape to the surface of the wavelength conversion film may be imparted to the surface of the drum or the band.

In addition, the same steps can also be performed by using an elongated film which is continuously transported as a support and applying the composition according to the present invention to the support. The elongated film may be used as it is as the substrate of the wavelength conversion member according to the present invention and may be peeled off and removed during the manufacturing steps.

In addition, in order to impart light scattering properties to the obtained wavelength conversion film, at least a part of the obtained wavelength conversion film may be microporous. As specific means for achieving the above configuration, for example, 0.01 to 1.0 part by mass of a second volatile component may be added with respect to 100 parts by mass of the binder precursor in the wavelength conversion film-forming composition according to the present invention, the second volatile component being a poor solvent with respect to the binder which is obtained from the binder precursor in the volatile component, having a higher boiling point than the volatile component, and being compatible or soluble in the binder precursor. As a result, in the volatile component removal step, voids are formed in the film due to aggregation in the gel film while the second volatile component is being relatively concentrated. Finally, the second volatile component is also removed, and thus micropores can be formed. In the wavelength conversion film-forming composition according to the present invention, due to the above-described mechanism, only pores having a size of several hundreds of nanometers to several tens of micrometers which is suitable for a light scattering layer can be selectively formed. The pore size and the porosity of the wavelength conversion film per unit volume can be set depending on desired light scattering properties. This configuration can be achieved by adjusting the addition amount of the second volatile component and the amount of the volatile component removed per unit time in the volatile component removal step. Here, "poor solvent" refers to a solvent in which a swelling ratio of the obtained binder is lower than 0.1% when dipped in a solvent for 1 hour. In addition, the swelling ratio of the obtained binder refers to a mass change before and after dipping 100 parts by mass of the binder solid content in the solvent for 1 hour and is a value obtained from the following expression.

Swelling Ratio=[(Weight after Dipping)−(Weight before Dipping)]÷(Weight before Dipping)×100

(Manufacturing Example 2 Using Light Irradiation Gelling Step)

Next, an aspect in which the composition according to the present invention includes both a photopolymerizable binder precursor and a binder will be described. In this method described below, as examples of the above-described materials, the composition according to the present invention includes: an acrylate monomer and a photopolymerization initiator as the binder precursor; cellulose acylate as the binder; and a mixture of dichloromethane and ethanol as the volatile component, in which a wavelength conversion film can be formed in an elongated sheet shape through the light irradiation gelling step in a state where it includes the volatile component.

As a manufacturing device, the same manufacturing device as that used in the manufacturing method using the cooling gelling step can be used. In this manufacturing device, the binder precursor is polymerized to gel by performing light irradiation on the metal support (light irradiation gelling step). At this time, in a case where the composition according to the present invention includes lower than 30 wt % of the binder precursor with respect to the total weight of all the components of the composition excluding the volatile component, the polymerization reaction may be completed. In this case, even in a case where the reaction of the entire binder precursor is completed, the structure of the binder forming the layer is loosely maintained by other components such as the binder, and the volatile component can be efficiently removed in a drying step described below. As described above, the viscosity of the composition (gel film) after the gelling step at a shear rate of 1 [s$^{-1}$] is preferably 200 Pa·s or higher, more preferably 400 Pa·s or higher, and still more preferably 1000 Pa·s or higher. It is more preferable that the composition is self-supporting. The modulus of elongation of the gel film when the gel film is peeled off from the metal support is preferably 1 Mpa or higher and is more preferably 3 MPa or higher form the viewpoint of enduring a transport tension at which a transport speed suitable for productivity can be realized. In addition, the amount of the volatile component (in the embodiment described herein, dichloromethane and ethanol) in the wavelength conversion film-forming composition according to this aspect is preferably 10 to 300 parts by mass and more preferably 20 to 100 parts by mass with respect to 100 parts by mass of the solid content converted into the polymerized binder in the gel film immediately after the gelling step from the viewpoint of improving the removal efficiency of the subsequent volatile component removal step. This value can be determined by collecting the gel film immediately after the gelling step, heating the volatile component at 180° C. for 1 hour to remove the volatile component, and measuring a mass change from the remaining solid content.

In a case where the polymerization of the polymerizable compound is not completed in the gelling step, it is preferable that the polymerization of the polymerizable compound is completed by performing light irradiation or energy ray irradiation in any one of the subsequent steps. Alternatively, the polymerization of the polymerizable compound may be completed by performing light irradiation or energy ray irradiation after sealing a barrier film and the like described below.

In addition, in order to impart light scattering properties to the obtained wavelength conversion film, at least a part of the obtained wavelength conversion film may be microporous. As a specific method, in the above-described manner, a poor solvent with respect to the binder or the binder obtained from the binder precursor is added to the wavelength conversion film-forming composition according to the present invention, and the amount of the poor solvent added and the amount of the poor solvent removed in the volatile component removal step per unit time are added. As a result, preferable light scattering properties can be imparted.

<Third Method of Manufacturing Wavelength Conversion Film: Shear Change Method>

In a third preferable aspect of the method of manufacturing a wavelength conversion film according to the present invention, the wavelength conversion film-forming composition includes a thixotropy imparting agent, and in the gelling step, the gel film is formed by performing the shear force changing treatment on the coating film.

The composition according to the present invention which can be applied to the gelling step using a shear change method includes a binder precursor and a gelling agent which imparts thixotropy.

As a manufacturing device, the above-described casting device, or various coating devices which can perform coating on various substrates can be used. The composition according to the present invention can be caused to gel by not applying a shear force or a flow until the volatile component is removed after forming a layer using the composition jetted from a coater. That is, in the gelling step, the substrate to which the composition according to the present invention is applied is transported without applying a tilting angle, a wind pressure, or vibration thereto. Accordingly, in this aspect, it is preferable that the volatile component removal step is completed while maintaining a state where a movement relative to the support is not applied by applying the composition according to the present invention to the elongated support (substrate) such as a polymer film or to the support (substrate) on the endless band and causing the composition to gel.

As can be seen in Examples described below, in the wavelength conversion film which is manufactured using the method of manufacturing a wavelength conversion film according to the present invention, aggregation of quantum dots cannot be observed by visual inspection in scanning electron microscope-energy dispersive X-ray spectrophotometry (SEM-EDX). In a case where a liquid crystal display device which is prepared using the wavelength conversion film according to the present invention is turned on such that the entire surface is displayed white, white color is observed by visual inspection, and a decrease in the emission efficiency caused by aggregation of the quantum dots is not observed.

As described above, the wavelength conversion film-forming composition according to the present invention includes at least quantum dots, a volatile component, and a binder that is soluble in the volatile component and/or a binder precursor that is soluble in or compatible with the volatile component, and the wavelength conversion film-forming composition is gellable in the presence of the volatile component. According to this configuration, the coating film of the wavelength conversion film-forming composition including the volatile component can be caused to gel in a state where it includes the volatile component, and the volatile component removal step where the quantum dots are likely to aggregate can be performed in a state where the mobility of the quantum dots is controlled. Accordingly, by using the wavelength conversion film-forming composition according to the present invention, the degree of freedom for material design is high, and a wavelength conversion film having a high emission efficiency can be formed while suppressing aggregation of the quantum dots during curing.

Figure 3:
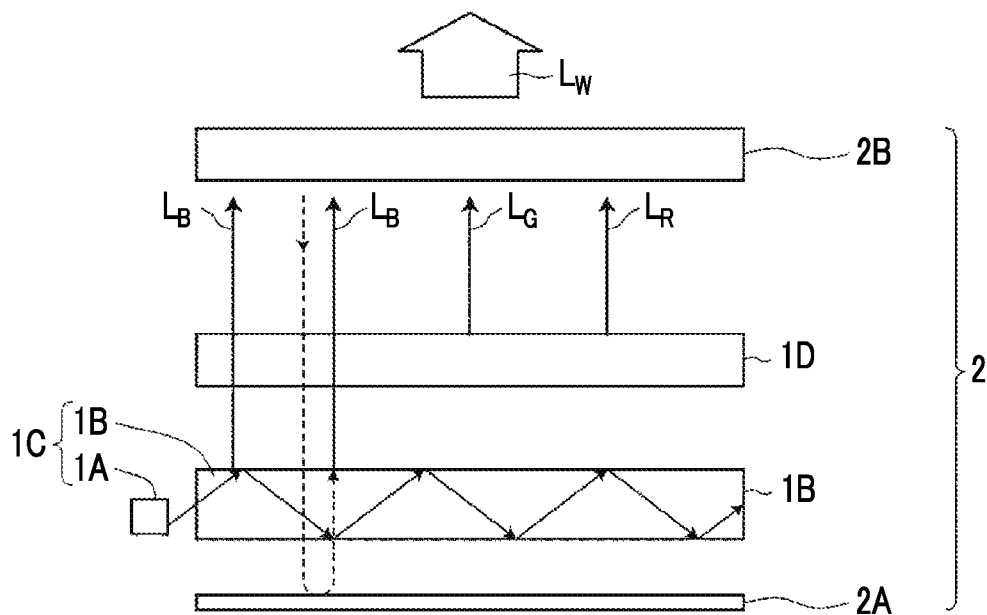
FIG. 3 is a cross-sectional view showing a schematic configuration of a backlight unit including a wavelength conversion member according to an embodiment of the present invention.
Figure 4:
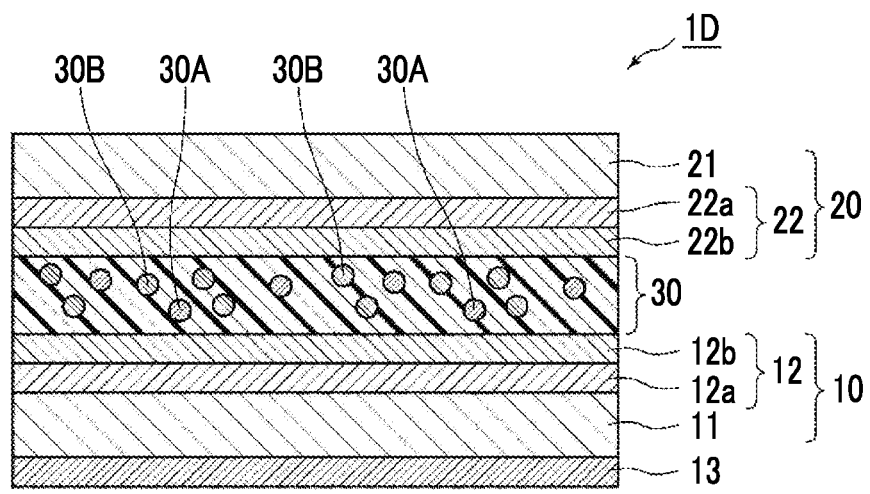
FIG. 4 is a cross-sectional view showing a schematic configuration of a wavelength conversion member according to an embodiment of the present invention.

[Wavelength Conversion Member and Backlight Unit] A wavelength conversion member according to an embodiment of the present invention and a backlight unit including the wavelength conversion member will be described with reference to the drawings. FIG. 3 is a cross-sectional view showing a schematic configuration of the backlight unit including the wavelength conversion member according to the embodiment. FIG. 4 is a cross-sectional view showing a schematic configuration of the wavelength conversion member according to the embodiment. In the drawings of this specification, dimensions of respective portions are appropriately changed in order to easily recognize the respective portions. In this specification, numerical ranges represented by "to" include numerical values before and after "to" as lower limit values and upper limit values.

As described above, the backlight unit 2 shown in FIG. 3 includes: a surface light source 1C including a light source 1A, which emits primary light (blue light $L_B$), and a light guide plate 1B which guides and emits the primary light emitted from the light source 1A; a wavelength conversion member 1D that is provided on the surface light source 1C; a retroreflecting member 2B that is disposed to face the surface light source 1C with the wavelength conversion member 1D interposed therebetween; and a reflection plate 2A that is disposed to face the wavelength conversion member 1D with the surface light source 1C interposed therebetween. The wavelength conversion member 1D are excited by excitation light, which is at least a portion of the primary light $L_B$ emitted from the surface light source 1C, to emit fluorescence and emits secondary light ($L_G$, $L_R$) which includes the fluorescence and the primary light $L_B$ which has passed through the wavelength conversion member 1D.

As shown in FIG. 4, the wavelength conversion member 1D includes: the wavelength conversion film 30 including quantum dots, which are excited by excitation light to emit fluorescence, and being manufactured using the method of manufacturing a wavelength conversion film according to the present invention; and substrate films 11 and 21 that are provided on opposite surfaces of the wavelength conversion film 30. On surfaces of the substrates 11 and 21 on the wavelength conversion film 30 side, barrier layers 12 and 22 including organic layers 12a and 22a and inorganic layers 12b and 22b are formed in contact with the substrates 11 and 21, respectively. In addition, the substrate 11 includes an unevenness imparting layer 13 which imparts an uneven structure to a surface of the support 11 opposite to the wavelength conversion film 30 side. In the embodiment, the unevenness imparting layer 13 (mat layer) also functions as a light diffusion layer.

In FIG. 3, $L_B$, $L_G$, and $L_R$ emitted from the wavelength conversion member 1D are incident on the retroreflecting member 2B, and each incident light is repeatedly reflected between the retroreflecting member 2B and the reflection plate 2A and passes through the wavelength conversion member 1D multiple times. As a result, in the wavelength conversion member 1D, a sufficient amount of the excitation light (blue light $L_B$) is absorbed by the quantum dots 30A and 30B in the wavelength conversion film 30, a sufficient amount of fluorescence ($L_G$, $L_R$) is emitted, and white light $L_W$ is realized and emitted from the retroreflecting member 2B.

Hereinafter, the respective components of the wavelength conversion member 1D will be described.

[Wavelength Conversion Film (Wavelength Conversion Layer)]

In the embodiment, the wavelength conversion film (wavelength conversion layer) 30 is manufactured using the method of manufacturing a wavelength conversion film according to the present invention. In the wavelength conversion film 30, the quantum dots 30A and the quantum dots 30B are dispersed on the barrier film 10 in which the barrier layer 12 is provided on a surface of the substrate 11 (or on the barrier film 20 in which the barrier layer 22 is provided on a surface of the substrate 21), the quantum dots (phosphor) 30A are excited by the blue light $L_B$ in the organic matrix to emit fluorescence (red light) $L_R$, and the quantum dots (phosphor) 30B are excited by the blue light $L_B$ to emit the fluorescence (green light) $L_G$. In FIG. 4, the quantum dots 30A and 30B are enlarged and shown in order to easily recognize the quantum dots. Actually, for example, the thickness of the wavelength conversion film 30 is 50 to 100 μm, and the diameter of the quantum dot is about 2 to 7 nm. The details of the quantum dots are as described above in the item of the composition according to the present invention.

The thickness of the wavelength conversion film is preferably in a range of 1 to 300 μm, more preferably in a range of 10 to 200 μm, and still more preferably in a range of 20 to 100 μm. It is preferable that the thickness is 1 μm or more because a high wavelength conversion effect can be obtained. In addition, it is preferable that the thickness is 300 μm or less because, in a case where the wavelength conversion member is incorporated into a backlight unit, the thickness of the backlight unit can be reduced.

The wavelength conversion film 30 is manufactured using the method of manufacturing a wavelength conversion film according to the present invention. Therefore, as can be seen in Examples described below, aggregation of the quantum dots is reduced, and the emission efficiency is excellent.

[Barrier Film]

The barrier films 10 and 20 between which the wavelength conversion film 30 is interposed are films having a function of suppressing permeation of water and/or oxygen. In the embodiment, the barrier layers 12 and 22 are provided on the substrates 11 and 21, respectively. In this configuration, due to the presence of the substrates, the strength of the wavelength conversion member 1D is improved, and the films can be easily manufactured.

In the wavelength conversion members according to the embodiment, the barrier films 10 and 20 in which the barrier layers 12 and 22 are supported by the substrates 11 and 21 are provided such that the barrier layers 12 and 22 are adjacent to opposite main surfaces of the wavelength conversion film 30. However, the barrier layers 12 and 22 are not necessarily supported by the substrates 11 and 21. In addition, in a case where the substrates 11 and 21 have sufficient barrier properties, the barrier layers may include only the substrates 11 and 21.

In addition, it is preferable that the barrier films 10 and 20 are provided on opposite surfaces of the wavelength conversion film 30 as in the embodiment. However, the barrier films 10 and 20 may be provided on only a single surface of the wavelength conversion film 30.

The total light transmittance of the barrier film in the visible range is 80% or higher and more preferably 90% or higher. The visible range refers to a wavelength range of 380 nm to 780 nm, and the total light transmittance refers to an average light transmittance value in the visible range.

The oxygen permeability of the barrier films 10 and 20 is preferably 1.00 cm$^3$/(m$^2$·day·atm) or lower. The oxygen permeability of the barrier films 10 and 20 is more preferably 0.10 cm$^3$/(m$^2$·day·atm) or lower, and still more preferably 0.01 cm$^3$/(m$^2$·day·atm) or lower. In this specification, the oxygen permeability is a value measured using an oxygen permeability measuring device (OX-TRAN 2/20 (trade name), manufactured by Mocon Inc.) under conditions of measurement temperature: 23° C. and relative humidity: 90%. In this specification, the unit of the oxygen permeability is [cm$^3$/(m$^2$·day·atm)]. An oxygen permeability of 1.0 cm$^3$/(m$^2$·day·atm) corresponds to $1.14 \times 10^{-1}$ fm/Pa·s in SI units.

The barrier films 10 and 20 have not only a gas barrier function of blocking oxygen but also a function of blocking water (water vapor). In the wavelength conversion member 1D, the moisture permeability (water vapor transmission rate) of the barrier film 10 and 20 is 0.10 g/(m$^2$·day·atm) or lower. The moisture permeability of the barrier film 10 and 20 is preferably 0.01 g/(m$^2$·day·atm) or lower. In this specification, the moisture permeability of the barrier layer is a value measured under conditions of measurement temperature: 40° C. and relative humidity: 90% RH using a method (calcium method) described in G. NISATO, P. C. P. BOUTEN, P. J. SLIKKERVEER et al., SID Conference Record of The International Display Research Conference, pages 1435-1438. In this specification, the unit of the moisture permeability is [g/(m$^2$·day·atm)]. A moisture permeability of 0.1 g/(m$^2$·day·atm) corresponds to $1.14 \times 10^{-11}$ g/(m$^2$·s·Pa) in SI units.

<Substrate>

From the viewpoints of impact resistance and the like of the wavelength conversion member, the average thickness of the substrates 11 and 21 is preferably 10 μm to 500 μm, more preferably 20 μm to 400 μm, and still more preferably 30 μm to 300 μm. In a configuration where the retroreflection of light is increased as in a case where the concentration of the quantum dots 30A and 30B in the wavelength conversion film 30 is reduced or a case where the thickness of the wavelength conversion film 30 is reduced, it is preferable that the absorbance of light at a wavelength of 450 nm is low. Therefore, from the viewpoint of suppressing a decrease in brightness, the average thickness of the substrates 11 and 21 is preferably 40 μm or less and more preferably 25 μm or less.

In order to further reduce the concentration of the quantum dots 30A and 30B in the wavelength conversion film 30 or to further reduce the thickness of the wavelength conversion film 30, it is necessary that the number of times where the excitation light passes through the wavelength conversion film is increased by providing means for increasing retroreflection of light, for example, a plurality of prism sheets in the retroreflecting member 2B of the backlight unit to maintain a display color of an LCD. Accordingly, it is preferable that the substrate is a transparent substrate which is transparent to visible light. Here, "transparent to visible light" represents that the light transmittance in the visible range is 80% or higher and preferably 85% or higher. The light transmittance used as an index for transparency can be measured using a method described in JIS-K 7105. That is, using an integrating sphere light transmittance measuring device, the total light transmittance and the scattered light amount are measured, and the diffuse transmittance is subtracted from the total light transmittance to obtain the light transmittance. The details of the substrate can be found in paragraphs "0046" to "0052" of JP2007-290369A and paragraphs "0040" to "0055" of JP2005-096108A.

In addition, the in-plane retardation Re(589) of the substrates 11 and 21 at a wavelength of 589 nm is preferably 1000 nm or lower, more preferably 500 nm or lower, and still more preferably 200 nm or lower.

When whether or not foreign matter or defects are present is inspected after the preparation of the wavelength conversion member 1D, foreign matter or defects can be easily found by disposing two polarizing plates at extinction positions and inserting the wavelength conversion member between the two polarizing plates to observe the wavelength conversion member. In a case where Re(589) of the substrate is in the above-described range, foreign matter or defects can be easily found during the inspection using the polarizing plates, which is preferable.

Here, Re(589) is measured using KOBRA 21ADH or WR (manufactured by Oji Scientific Instruments Co., Ltd.) by causing light at a wavelength of 589 nm to be incident in a film normal direction. The measurement wavelength λ nm can be selected by manually changing a wavelength selective filter or changing a measured value using a program or the like.

As the substrates 11 and 21, a substrate having barrier properties against oxygen and water is preferable. Preferable examples of the substrate include thin glass, a polyethylene terephthalate film, a film which includes a polymer having a cyclic olefin structure, and a polystyrene film.

<Barrier Layer>

It is preferable that the substrate 11 or 21 includes the barrier layer 12 or 22 including at least one inorganic barrier layer 12b or 22b which is formed adjacent to a surface on the wavelength conversion film 30 side.

As shown in FIG. 4, the barrier layer 12 or 22 may include at least one organic barrier layer 12a or 22a which is formed between the substrate 11 or 21 and the inorganic barrier layer 12b or 22b. The organic barrier layer 12a or 22a may be provided between the inorganic barrier layer 12b or 22b and the wavelength conversion film 30. From the viewpoint of improving weather fastness, it is preferable that a plurality of barrier layers are provided because barrier properties can be further improved. It is also preferable that the organic barrier layer is provided between the inorganic barrier layer 12b or 22b and the wavelength conversion film 30. In this case, the organic barrier layer may also be referred to as a barrier coating layer (overcoat layer).

The barrier layer 12 or 22 is formed on a surface of the substrate 11 or 21 as a support. Accordingly, the barrier film 10 or 20 includes: the substrate 11 or 21, and the barrier layer 12 or 22 that is formed on the support 11 or 21. In a case where the barrier layer 12 or 22 is provided, it is preferable that the substrate has high heat resistance. In the wavelength conversion member 1D, a layer of the barrier film 10 or 20 which is adjacent to the wavelength conversion film 30 may be an inorganic barrier layer or an organic barrier layer and is not particularly limited.

From the viewpoint of improving weather fastness, it is preferable that the barrier layer 12 or 22 includes a plurality of layers because barrier properties can be further improved. However, as the number of layers increases, the light transmittance of the wavelength conversion member is likely to decrease. Therefore, it is preferable that the barrier layer 12 or 22 is designed in consideration of excellent light transmittance and barrier properties.

(Inorganic Barrier Layer)

"Inorganic layer" is a layer including an inorganic material as a major component and is preferably a layer consisting only of an inorganic material.

The inorganic barrier layer 12b or 22b which is preferable for the barrier layer 12 or 22 is not particularly limited, and various inorganic compounds such as a metal, an inorganic oxide, an inorganic nitride, or an inorganic oxynitride can be used. As an element constituting the inorganic material, silicon, aluminum, magnesium, titanium, tin, indium, or cerium is preferable. The inorganic material may include one element or two or more elements among the above elements. Specific examples of the inorganic compound include silicon oxide, silicon oxynitride, aluminum oxide, magnesium oxide, titanium oxide, tin oxide, an indium oxide alloy, silicon nitride, aluminum nitride, and titanium nitride. In addition, as the inorganic barrier layer, a metal film such as an aluminum film, a silver film, a tin film, a chromium film, a nickel film, or a titanium film may be provided.

In particular, an inorganic barrier layer including a silicon oxide, a silicon nitride, a silicon oxynitride, a silicon carbide, or an aluminum oxide is preferable. The inorganic barrier layer formed of the above materials has excellent adhesiveness with the organic barrier layer. Therefore, in a case where a pin hole is formed on the inorganic barrier layer, the organic barrier layer can be effectively embedded in the pin hole, and barrier properties can be further suppressed.

In addition, it is more preferable that the inorganic barrier layer is formed of a silicon nitride from the viewpoint of suppressing light absorption in the barrier layer.

A method of forming the inorganic barrier layer is not particularly limited. For example, various film forming methods in which a film forming material can be evaporated or scattered to be deposited on a deposition target surface can be used.

Examples of the method of forming the inorganic barrier layer include: a vacuum deposition method of heating and depositing an inorganic material such as an inorganic oxide, an inorganic nitride, an inorganic oxynitride, or a metal; an oxidation deposition method of introducing oxygen gas and oxidizing an inorganic material as a raw material for deposition; a sputtering method of introducing argon gas and oxygen gas and sputtering an inorganic material as a target material for deposition; a physical vapor deposition (PVD) method, such as an ion plating method, of heating an inorganic material with a plasma beam generated by a plasma gun for deposition; and in a case where a deposited film formed of silicon oxide is formed, a chemical vapor deposition method of using an organic silicon compound as a raw material.

The thickness of the inorganic barrier layer may be 1 nm to 500 nm and is preferably 5 nm to 300 nm and more preferably 10 nm to 150 nm. By adjusting the thickness of the adjacent inorganic barrier layer to be in the above-described range, light absorption in the inorganic barrier layer can be suppressed while realizing excellent barrier properties, and the wavelength conversion member having a high light transmittance can be provided.

(Organic Barrier Layer)

"Organic layer" is a layer including an organic material as a major component in which the content of the organic material is preferably 50 mass % or higher, more preferably 80 mass % or higher, and still more preferably 90 mass % or higher. The details of the organic barrier layer can be found in paragraphs "0020" to "0042" of JP2007-290369A and paragraphs "0074" to "0105" of JP2005-096108A. It is preferable that the organic barrier layer includes a cardo polymer. As a result, adhesiveness between the organic barrier layer and an adjacent layer, in particular, adhesiveness between the organic barrier layer and the inorganic barrier layer is improved, and more favorable barrier properties can be realized. The details of the cardo polymer can be found in paragraphs "0085" to "0095" of JP2005-096108A. The thickness of the organic barrier layer is preferably in a range of 0.05 µm to 10 µm and more preferably in a range of 0.5 to 10 µm. In a case where the organic barrier layer is formed using a wet coating method, the thickness of the organic barrier layer is preferably in a range of 0.5 to 10 µm and more preferably in a range of 1 µm to 5 µm. In a case where the organic layer is formed using a dry coating method, the thickness of the organic layer is preferably in a range of 0.05 µm to 5 µm and more preferably in a range of 0.05 µm to 1 µm. By adjusting the thickness of the organic barrier layer, which is formed using a wet coating method or a dry coating method, adhesiveness with the inorganic layer can be further improved.

Other details of the inorganic barrier layer and the organic barrier layer can be found in JP2007-290369A, JP2005-096108A, and US2012/0113672A1.

(Design Change of Barrier Film)

In the wavelength conversion member 1D, the wavelength conversion film, the inorganic barrier layer, the organic barrier layer, and the substrate may be laminated in this order. The substrate may be provided between the inorganic barrier layer and the organic barrier layer, between two organic barrier layers, or between two inorganic barrier layers. In addition, although not shown in the drawing, the wavelength conversion film, the organic barrier layer, and the inorganic barrier layer may be laminated in this order without providing the substrate.

<Unevenness Imparting Layer (Mat Layer)>

It is preferable that the barrier film 10 or 20 includes an unevenness imparting layer (mat layer) 13 which imparts an uneven structure to a surface of the barrier film 10 or 20 opposite to the wavelength conversion film 30 side. In a case where the barrier film includes the mat layer, blocking properties and slipping properties of the barrier film can be improved, which is preferable. It is preferable that the mat layer is a layer including particles. Examples of the particles include inorganic particles such as silica, alumina, a metal oxide and organic particles such as crosslinked polymer particles. In addition, it is preferable that the mat layer is provided on a surface of the barrier film opposite to the wavelength conversion film. However, the mat layer may be provided on opposite surfaces of the barrier film.

<Light Scattering Layer>

The wavelength conversion member 1D may have a light scattering function for efficiently extracting the fluorescence of the quantum dots to the outside. The light scattering function may be provided in the wavelength conversion film 30, or a layer having a light scattering function may be separately provided as a light scattering layer.

In addition, the light scattering layer may be provided on a surface of the substrate opposite to the wavelength conversion film. In a case where the mat layer is provided, it is preferable that the mat layer functions not only as an unevenness imparting layer but also as a light scattering layer.

[Backlight Unit]

As described above, the backlight unit 2 shown in FIG. 3 includes: a surface light source 1C including a light source 1A, which emits primary light (blue light $L_B$), and a light guide plate 1B which guides and emits the primary light emitted from the light source 1A; a wavelength conversion member 1D that is provided on the surface light source 1C; a retroreflecting member 2B that is disposed to face the surface light source 1C with the wavelength conversion member 1D interposed therebetween; and a reflection plate 2A that is disposed to face the wavelength conversion member 1D with the surface light source 1C interposed therebetween. The wavelength conversion member 1D are excited by excitation light, which is at least a portion of the primary light $L_B$ emitted from the surface light source 1C, to emit fluorescence and emits secondary light ($L_G$, $L_R$) which includes the fluorescence and the primary light $L_B$ which does not function as excitation light.

From the viewpoint of realizing high brightness and high color reproducibility, it is preferable that the backlight unit includes a multi-wavelength light source. For example, it is preferable that blue light having a center emission wavelength in a wavelength range of 430 nm to 480 nm and having a full width at half maximum of emission peak of 100 nm or less, green light having a center emission wavelength in a wavelength range of 500 nm or longer and shorter than 600 nm and having a full width at half maximum of emission peak of 100 nm or less, and red light having a center emission wavelength in a wavelength range of 600 nm to 680 nm and having a full width at half maximum of emission intensity peak of 100 nm or less are emitted.

From the viewpoint of further improving brightness and color reproducibility, the wavelength range of the blue light emitted from the backlight unit 2 is preferably 430 nm to 480 nm and more preferably 440 nm to 460 nm.

From the same viewpoint, the wavelength range of the green light emitted from the backlight unit 2 is preferably 520 nm to 560 nm and more preferably 520 nm to 545 nm.

From the same viewpoint, the wavelength range of the red light emitted from the backlight unit is preferably 600 nm to 680 nm and more preferably 610 nm to 640 nm.

In addition, from the same viewpoint, the full width at half maximum of the emission intensity of each of the blue light, the green light, and the red light emitted from the backlight unit is preferably 80 nm or less, more preferably 50 nm or less, still more preferably 40 nm or less, and still more preferably 30 nm or less. In particular, it is more preferable that the full width at half maximum of the emission intensity of the blue light is 25 nm or less.

The backlight unit 2 includes at least the wavelength conversion member 1D and the surface light source 1C. As the light source 1A, for example, a light source which emits blue light having a center emission wavelength in a wavelength range of 430 nm to 480 nm, or a light source which emits ultraviolet light can be used. As the light source 1A, for example, a light emitting diode or a laser light source can be used.

As shown in FIG. 3, the surface light source 1C may include: the light source 1A; and the light guide plate 1B that guides and emits the primary light emitted from the light source 1A. Alternatively, the surface light source 1C may include: the light source 1A that is disposed along with a plane parallel to the wavelength conversion member 1D; and a diffusion plate 1E that is provided instead of the light guide plate 1B. The former surface light source is called an edge light mode, and the latter surface light source is called a direct backlight mode.

In the embodiment, the example in which the surface light source is used as the light source has been described. As the light source, a light surface other than the surface light source can also be used.

(Configuration of Backlight Unit)

In the above description regarding FIG. 3, the configuration of the backlight unit is an edge light mode including a light guide plate or a reflection plate as a component. However, the configuration of the backlight unit may be a direct backlight mode. As the light guide plate, a well-known light guide plate can be used without any particular limitation.

In addition, as the reflection plate 2A, a well-known reflection plate can be used without any particular limitation. The details of the reflection plate 2A can be found in JP3416302B, JP3363565B, JP4091978B, and JP3448626B, the contents of which are incorporated herein by reference.

The retroreflecting member 2B may be formed of a well-known diffusion plate, a diffusion sheet, a prism sheet (for example, BEF series, manufactured by Sumitomo 3M Ltd.), or a light guide. The configuration of the retroreflecting member 2B can be found in JP3416302B, JP3363565B, JP4091978B, and JP3448626B, the contents of which are incorporated herein by reference.

[Liquid Crystal Display Device]

Figure 5:
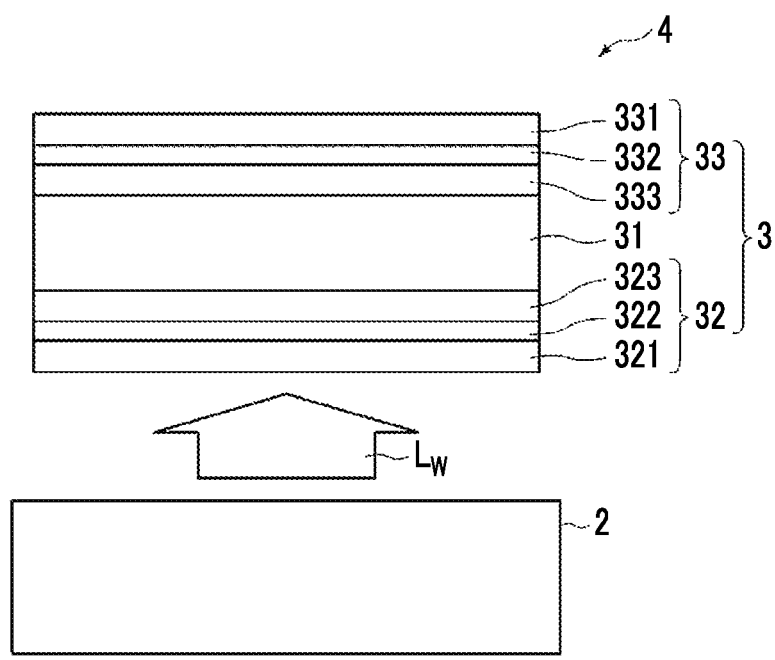
FIG. 5 is a cross-sectional view showing a schematic configuration of a liquid crystal display device including a backlight unit according to an embodiment of the present invention.

The above-described backlight unit 2 can be applied to a liquid crystal display device. As shown in FIG. 5, a liquid crystal display device 4 includes: the backlight unit 2 according to the embodiment; and a liquid crystal cell unit 3 that is disposed to face the retroreflecting member side of the backlight unit 2.

In the liquid crystal cell unit 3, as shown in FIG. 5, a liquid crystal cell 31 is interposed between polarizing plates 32 and 33. In the polarizing plates 32 and 33, opposite main surfaces of polarizers 322 and 332 are protected by polarizing plate protective films 321 and 323 and polarizing plate protective films 331 and 333, respectively.

Regarding each of the liquid crystal cell 31, the polarizing plates 32 and 33, and other components which constitute the liquid crystal display device 4, a product prepared using a well-known method or a commercially available product can be used without any particular limitation. In addition, undoubtedly, a well-known interlayer such as an adhesive layer can be provided between respective layers.

As a driving mode of the liquid crystal cell 31, various modes such as a twisted nematic (TN) mode, a super twisted nematic (STN) mode, a vertical alignment (VA) mode, an in-plane switching (IPS) mode, or an optically compensated bend (OCB) cell mode can be used without any particular limitation. The liquid crystal cell is preferably a VA mode, an OCB mode, an IPS mode, or a TN mode but is not limited thereto. Examples of the configuration of the VA mode liquid crystal display device include a configuration shown in FIG. 2 described in JP2008-262161A. However, a specific configuration of the liquid crystal display device is not particularly limited, and a well-known configuration can be adopted.

Optionally, the liquid crystal display device 4 further includes an optical compensation member for optical compensation or a sub-functional layer such as an adhesive layer. Further, in addition to (or instead of) a color filter substrate, a thin film transistor substrate, a lens film, a diffusion sheet, a hard coat layer, an anti-reflection layer, a low-reflection layer, or an anti-glare layer, a surface layer such as a forward scattering layer, a primer layer, an antistatic layer, or a undercoat layer may be disposed.

The backlight-side polarizing plate 32 may include a phase difference film as the polarizing plate protective film 323 on the liquid crystal cell 31 side. As this phase difference film, for example, a well-known cellulose acylate film can be used.

The backlight unit 2 and the liquid crystal display device 4 includes the wavelength conversion member according to the present invention having a small light loss. Therefore, the backlight unit 2 and the liquid crystal display device 4 exhibit the same effects as those of the wavelength conversion member according to the present invention, in which peeling at an interface of the wavelength conversion film including quantum dots is not likely to occur, the emission intensity is not likely to decrease, and the brightness is high.

EXAMPLES

Hereinafter, the present invention will be described in detail using examples. Materials, used amounts, ratios, treatment details, treatment procedures, and the like shown in the following examples can be appropriately changed within a range not departing from the scope of the present invention. Accordingly, the scope of the present invention is not limited to the following specific examples.

1. Preparation of Barrier Film

First, a barrier film used as a substrate of a wavelength conversion member was prepared.

A barrier layer was formed on a single surface of a polyethylene terephthalate film (PET film, manufactured by Toyobo Co., Ltd. trade name: COSMOSHINE (registered trade name) A4300, thickness: 50 μm) in the following procedure. A mat layer was formed on opposite surfaces of COSMOSHINE A4300.

Trimethylolpropane triacrylate (TMPTA, manufactured by Daicel-Cytec Co., Ltd.) and a photopolymerization initiator (trade name: ESACURE (registered trade name) KTO 46, manufactured by Lamberti S.p.A.) were prepared and were weighed such that a mass ratio thereof was 95:5. These components were dissolved in methyl ethyl ketone. As a result, a coating solution having a solid content concentration of 15% was obtained. This coating solution was applied to the above-described PET film using a roll-to-roll method with a die coater and was allowed to pass through a drying zone at 50° C. for 3 minutes. Next, in a nitrogen atmosphere, the coating solution was irradiated with ultraviolet light (cumulative irradiation dose: about 600 mJ/cm$^2$) to be cured, and the PET film was wound. The thickness of the first organic layer formed on the substrate was 1 μm.

Next, using a roll-to-roll chemical vapor deposition (CVD) apparatus, an inorganic layer (silicon nitride layer) was formed on a surface of the organic layer. As raw material gases, silane gas (flow rate: 160 sccm), ammonia gas (flow rate: 370 sccm), hydrogen gas (flow rate: 590 sccm), and nitrogen gas (flow rate: 240 sccm) were used. As a power supply, a high-frequency power supply having a frequency of 13.56 MHz was used. The film forming pressure was 40 Pa, and the achieved thickness was 50 nm. This way, a barrier film in which the inorganic layer was laminated on a surface of the organic layer was prepared.

2. Preparation of Wavelength Conversion Member

Example 1

<Method of Manufacturing Film by Cooling Gelling>

As a wavelength conversion film-forming composition 1, the following composition was prepared. The obtained composition was put into a sealed bezel, and the atmosphere was purged with dry nitrogen gas having an oxygen concentration of 0.2 volume ppm and a dew point of −70° C. Cellulose triacetate used in this example was a polymer having an UCST of about 0° C. in a dichloromethane-methanol-butanol mixed solution described herein. Regarding quantum dots A and quantum dots B, a quantum dot dispersion (CZ-520-100, manufactured by NN-Labs LLC.) having a maximum emission wavelength of 535 nm and a quantum dot dispersion (CZ-620-100, manufactured by NN-Labs LLC.) having a maximum emission wavelength of 630 nm were prepared. In order to prepare the composition according to this example, the solvent was replaced with dichloromethane, and a dichloromethane dispersion was prepared. Here, in these quantum dots, a core was CdSe, a shell was ZnS, and a ligand was octadecylamine. Before replacing the solvent with dichloromethane, the quantum dots were dispersed in toluene in a concentration of 3 wt %.

| Wavelength Conversion Film-Forming Composition 1 | |
|---|---|
| Cellulose Triacetate (Substitution Degree: 2.84) | 100 Parts by Mass |
| Dichloromethane | 320 Parts by Mass |
| Methanol | 83 Parts by Mass |
| 1-Butanol | 3 Parts by Mass |
| Triphenyl Phosphate | 7.6 Parts by Mass |
| Diphenyl Phosphate | 3.8 Parts by Mass |
| Quantum Dots A (Maximum Emission Wavelength: 535 nm) | 0.01 Parts by Mass |
| Quantum Dots B (Maximum Emission Wavelength: 630 nm) | 0.01 Parts by Mass |

Using a manufacturing device described in Examples of JP2005-272485A, the obtained wavelength conversion film-forming composition 1 was adjusted such that the supply temperature of the composition was 36° C. and the dope temperature on a band was −4° C. The obtained self-supporting web was peeled off from the band and was dried to remove a volatile component. As a result, an elongated film-shaped wavelength conversion film 1 having a thickness of about 60 μm was obtained. The amount of the volatile component remaining in the wavelength conversion film was 0.1 parts by mass with respect to 100 parts by mass of the wavelength conversion film 1 when determined by gas chromatography.

The barrier film prepared using the above-described method was adhered to opposite surfaces of the wavelength conversion film 1 using a pressure sensitive adhesive. As a result, a wavelength conversion member 1 was obtained.

Example 2

<Method 1 of Manufacturing Film by Light Irradiation Gelling>

As a wavelength conversion film-forming composition 2, the following composition was prepared. During the preparation, regarding the quantum dots A and B, the same quantum dot dispersions as in Example 1 were prepared. In order to prepare the composition according to this example, the solvent was replaced with butyl acrylate, and a butyl acrylate dispersion was prepared. The obtained composition was put into a sealed bezel, and the atmosphere was purged with dry nitrogen gas having an oxygen concentration of 0.2 volume ppm and a dew point of −70° C.

| Wavelength Conversion Film-Forming Composition 2 | |
| --- | --- |
| Hydroxyethyl Acrylate | 30 Parts by Mass |
| Urethane Acrylate (ARONIX M1600 (trade name), manufactured by Toagosei Co., Ltd.) | 60 Parts by Mass |
| Butyl Acrylate | 40 Parts by Mass |
| Photopolymerization Initiator (IRGACURE 184 (trade name)) | 3 Parts by Mass |
| Quantum Dots A (Maximum Emission Wavelength: 535 nm) | 0.01 Parts by Mass |
| Quantum Dots B (Maximum Emission Wavelength: 630 nm) | 0.01 Parts by Mass |

Using the manufacturing device described in Examples of JP2005-272485A, the obtained wavelength conversion film-forming composition 2 was irradiated with light on the band such that the total irradiation dose was 200 mJ/cm$^2$. The obtained self-supporting web was peeled off from the band, was dried in a drying zone to remove 30 parts by mass of the remaining volatile component (butyl acrylate) and was exposed to light using a 2 kW high-pressure mercury lamp such that the total light irradiation dose was 300 ml/cm$^2$. As a result, an elongated film-shaped wavelength conversion film 2 having a thickness of about 60 μm was obtained. The amount of the volatile component remaining in the wavelength conversion film was less than 0.1 parts by mass with respect to 100 parts by mass of the wavelength conversion film when determined by gas chromatography.

In addition, a wavelength conversion member 2 was obtained using the same method as in Example 1, except that the wavelength conversion film 2 was used.

Example 3

<Method 2 of Manufacturing Film by Light Irradiation Gelling>

As a wavelength conversion film-forming composition 3, the following composition was prepared. Regarding the quantum dots A and B, the commercially available products (CZ-520-100 manufactured by NN-Labs LLC. and CZ-620-100 manufactured by NN-Labs LLC.) used in Example 1 in which the solvent was not replaced were used. The obtained composition was put into a sealed bezel, and the atmosphere was purged with dry nitrogen gas having an oxygen concentration of 0.2 volume ppm and a dew point of −70° C.

| Wavelength Conversion Film-Forming Composition 3 | |
| --- | --- |
| Isocyanuric Group-Containing Acrylate (A-9300, manufactured by Shin-Nakamura Chemical Co., Ltd.) | 90 Parts by Mass |
| Trimethylolpropane Triacrylate (TMPTA (trade name), manufactured by Shin-Nakamura Chemical Co., Ltd.) | 10 Parts by Mass |
| Toluene | 180 Parts by Mass |
| Methyl Ethyl Ketone (MEK) | 20 Parts by Mass |
| Photopolymerization Initiator (IRGACURE 819 (trade name)) | 1 Part by Mass |
| Quantum Dots A (Maximum Emission Wavelength: 535 nm) | 0.01 Parts by Mass |
| Quantum Dots B (Maximum Emission Wavelength: 630 nm) | 0.01 Parts by Mass |

Using the manufacturing device described in Examples of JP2005-272485A, the obtained wavelength conversion film-forming composition 3 was irradiated with light on the band such that the total irradiation dose was 200 mJ/cm$^2$, and was dried such that the amount of the volatile component remaining in the band immediately after the gelling was 10 mass %. Next, the obtained self-supporting web was peeled off from the band, was further dried in a drying zone to remove the remaining volatile component (toluene and MEK) and was exposed to light using a 2 kW high-pressure mercury lamp such that the total light irradiation dose was 300 mJ/cm$^2$. As a result, an elongated film-shaped wavelength conversion film 3 having a thickness of about 60 μm was obtained. The amount of the volatile component remaining in the wavelength conversion film was less than 0.1 parts by mass with respect to 100 parts by mass of the wavelength conversion film when determined by gas chromatography.

In addition, a wavelength conversion member 3 was obtained using the same method as in Example 2, except that the wavelength conversion film 3 was used.

Example 4

<Method 3 of Manufacturing Film by Light Irradiation Gelling>

A wavelength conversion film-forming composition 4 was prepared using the same method as in Example 3, except that the composition thereof was changed as follows. The obtained composition was put into a sealed bezel, and the atmosphere was purged with dry nitrogen gas having an oxygen concentration of 0.2 volume ppm and a dew point of −70° C.

| Wavelength Conversion Film-Forming Composition 4 | |
| --- | --- |
| Urethane Group-Containing Acrylate (UA-306H (trade name), manufactured by Kyoeisha Chemical Co., Ltd.) | 80 Parts by Mass |
| Urethane Group-Containing Acrylate (UA15HA (trade name), manufactured by Kyoeisha Chemical Co., Ltd.) | 20 Parts by Mass |
| Toluene | 200 Parts by Mass |
| Photopolymerization Initiator (IRGACURE 819 (trade name)) | 1 Part by Mass |
| Quantum Dots A (Maximum Emission Wavelength: 535 nm) | 0.01 Parts by Mass |
| Quantum Dots B (Maximum Emission Wavelength: 630 nm) | 0.01 Parts by Mass |

An elongated film-shaped wavelength conversion film 4 having a thickness of about 60 μm was obtained using the same method as in Example 3, except that the obtained wavelength conversion film-forming composition 4 was used. The amount of the volatile component remaining in the wavelength conversion film was less than 0.1 parts by mass with respect to 100) parts by mass of the wavelength conversion film when determined by gas chromatography.

In addition, a wavelength conversion member 4 was obtained using the same method as in Example 2, except that the wavelength conversion film 4 was used.

Example 5

<Method 4 of Manufacturing Film by Light Irradiation Gelling>

As a wavelength conversion film-forming composition 5, the following composition was prepared. During the preparation, regarding the quantum dots A and B, the same quantum dot dispersions as in Example 1 were prepared. In order to prepare the composition according to this example, the solvent was replaced with dichloromethane, and a dichloromethane dispersion was prepared. The obtained composition was put into a sealed bezel, and the atmosphere was purged with dry nitrogen gas having an oxygen concentration of 0.2 volume ppm and a dew point of −70° C.

| Wavelength Conversion Film-Forming Composition 5 | |
| --- | --- |
| Cellulose Triacetate (Substitution Degree: 2.84) | 90 Parts by Mass |
| Dichloromethane | 358 Parts by Mass |
| Methanol | 40 Parts by Mass |
| Trimethylolpropane Triacrylate (TMPTA (trade name), manufactured by Shin-Nakamura Chemical Co., Ltd.) | 10 Parts by Mass |
| Photopolymerization Initiator (IRGACURE 184 (trade name)) | 0.5 Parts by Mass |
| Quantum Dots A (Maximum Emission Wavelength: 535 nm) | 0.01 Parts by Mass |
| Quantum Dots B (Maximum Emission Wavelength: 630 nm) | 0.01 Parts by Mass |

Using a manufacturing device described in Examples of JP2005-272485A, the obtained wavelength conversion film-forming composition 5 was adjusted such that the supply temperature of the composition was 36° C. and the dope temperature on a band was 25° C. The dope was cast on the band, and then immediately was irradiated with light on the band to gel such that the total light irradiation dose was 900 mJ/cm². The obtained self-supporting web was peeled off from the band and was dried to remove a volatile component. As a result, an elongated film-shaped wavelength conversion film 5 having a thickness of about 60 μm was obtained. The amount of the volatile component remaining in the wavelength conversion film was 0.1 parts by mass with respect to 100 parts by mass of the wavelength conversion film when determined by gas chromatography.

In addition, a wavelength conversion member 5 was obtained using the same method as in Example 1, except that the wavelength conversion film 5 was used.

Example 6

<Method 1 of Manufacturing Film by Shear Change>

As a wavelength conversion film-forming composition 6, the following composition was prepared. The obtained composition was put into a sealed bezel, and the atmosphere was purged with dry nitrogen gas having an oxygen concentration of 0.2 volume ppm and a dew point of −70° C. Low crystalline cellulose nanoparticles added imparts thixotropy to an ethanol solution and forms a gel having a viscosity of 200 Pa·s in a stationary state. However, under flowing conditions a composition having a low viscosity of 10 Pa·s or lower can be obtained. During the preparation, regarding the quantum dots A and B, the same quantum dot dispersions as in Example 1 were prepared in the form of a toluene dispersion. In order to prepare the composition according to this example, the solvent was replaced with dehydrated ethanol, and a ethanol dispersion was prepared.

| Wavelength Conversion Film-Forming Composition 6 | |
| --- | --- |
| Hydroxyethyl Acrylate | 35 Parts by Mass |
| Urethane Acrylate (ARONIX M1600 (trade name), manufactured by Toagosei Co., Ltd.) | 65 Parts by Mass |
| Low Crystalline Cellulose Nanoparticles (NANOWHIP (trade name, manufactured by FineFoods Co., Ltd.) | 3 Parts by Mass |
| Ethanol | 100 Parts by Mass |
| Photopolymerization Initiator (IRGACURE 184 (trade name)) | 3 Parts by Mass |
| Quantum Dots A (Maximum Emission Wavelength: 535 nm) | 0.01 Parts by Mass |
| Quantum Dots B (Maximum Emission Wavelength: 630 nm) | 0.01 Parts by Mass |

The obtained wavelength conversion film-forming composition 6 was applied to the barrier layer of the barrier film (elongated film), which was prepared using the above-described above, using a die coater and then was horizontally transported for 1 minute without applying vibration such that it gels. Next, the volatile component (ethanol) was removed in a drying zone, and the gel film was polymerized by being irradiated with light such that the total light irradiation dose was 900 mJ/cm². As a result, an elongated film-shaped wavelength conversion film 6 having a thickness of about 60 μm was obtained. The amount of the volatile component remaining in the wavelength conversion film was less than 0.1 parts by mass with respect to 100 parts by mass of the wavelength conversion film when determined by gas chromatography.

The barrier film prepared using the above-described method was adhered to a surface of the wavelength conversion film 6 where the barrier film is not provided using a pressure sensitive adhesive. As a result, a wavelength conversion member 6 was obtained.

Example 7

<Method 2 of Manufacturing Film by Shear Change>

As a wavelength conversion film-forming composition 7, the following composition was prepared. The obtained composition was put into a sealed bezel, and the atmosphere was purged with dry nitrogen gas having an oxygen concentration of 0.2 volume ppm and a dew point of −70° C. Low crystalline cellulose nanoparticles added imparts thixotropy to an acetone solution and forms a gel having a viscosity of 200 Pa·s in a stationary state. However, under flowing conditions, only viscosity derived from polymethyl methacrylate is exhibited. During the preparation, regarding the quantum dots A and B, the same quantum dot dispersions as in Example 1 were prepared. In order to prepare the composition according to this example, the solvent was replaced with dehydrated acetone, and an acetone dispersion was prepared.

| Wavelength Conversion Film-Forming Composition 7 | |
| --- | --- |
| Polymethyl Methacrylate (manufactured by Mitsubishi Rayon Co., Ltd.) | 100 Parts by Mass |
| Low Crystalline Cellulose Nanoparticles (NANOWHIP (trade name, manufactured by FineFoods Co., Ltd.) | 1.5 Parts by Mass |
| Acetone | 300 Parts by Mass |
| Quantum Dots A (Maximum Emission Wavelength: 535 nm) | 0.01 Parts by Mass |
| Quantum Dots B (Maximum Emission Wavelength: 630 nm) | 0.01 Parts by Mass |

Using a manufacturing device described in Examples of JP2005-272485A, the obtained wavelength conversion film-forming composition 7 was adjusted such that the supply temperature of the composition was 36° C. and the dope temperature on a band was 25° C. The dope was cast on the band and was transported without applying vibration such that it gels, and was dried on the band. The obtained self-supporting web was peeled off from the band and was dried to remove a volatile component. As a result, an elongated film-shaped wavelength conversion film 7 having a thickness of about 60 μm was obtained. The amount of the volatile component remaining in the wavelength conversion film was 0.4 parts by mass with respect to 100 parts by mass of the wavelength conversion film when determined by gas chromatography.

The barrier film prepared using the above-described method was adhered to opposite surfaces of the wavelength conversion film 7 using a pressure sensitive adhesive. As a result, a wavelength conversion member 7 was obtained.

Comparative Example 1

A wavelength conversion film-forming composition 8 was prepared using the same method as in Example 1, except that the composition thereof was changed as follows. The obtained composition was put into a sealed bezel, and the atmosphere was purged with dry nitrogen gas having an oxygen concentration of 0.2 volume ppm and a dew point of −70° C. Polymethyl methacrylate is a polymer having UCST in a dichloromethane solution.

| Wavelength Conversion Film-Forming Composition 8 | |
|---|---|
| Polymethyl Methacrylate (manufactured by Mitsubishi Rayon Co., Ltd.) | 100 Parts by Mass |
| Dichloromethane | 400 Parts by Mass |
| Quantum Dots A (Maximum Emission Wavelength: 535 nm) | 0.01 Parts by Mass |
| Quantum Dots B (Maximum Emission Wavelength: 630 nm) | 0.01 Parts by Mass |

An elongated film-shaped wavelength conversion film 8 having a thickness of about 60 μm was obtained using the same method as in Example 1, except that the obtained wavelength conversion film-forming composition 8 was used. The amount of the volatile component remaining in the wavelength conversion film was 0.4 parts by mass with respect to 100 parts by mass of the wavelength conversion film when determined by gas chromatography.

The barrier film prepared using the above-described method was adhered to opposite surfaces of the wavelength conversion film 8 using a pressure sensitive adhesive. As a result, a wavelength conversion member 8 was obtained.

Comparative Example 2

An elongated film-shaped wavelength conversion film 9 having a thickness of about 60 μm was obtained using the same method as in Example 7, except that the wavelength conversion film-forming composition 8 was used. The amount of the volatile component remaining in the wavelength conversion film was 0.4 parts by mass with respect to 100 parts by mass of the wavelength conversion film when determined by gas chromatography. The barrier film prepared using the above-described method was adhered to opposite surfaces of the wavelength conversion film 9 using a pressure sensitive adhesive. As a result, a wavelength conversion member 9 was obtained.

Comparative Example 3

An elongated film-shaped wavelength conversion film 10 having a thickness of about 60 μm was obtained using the same method as in Example 6, except that the following composition was used as a wavelength conversion film-forming composition 10. This composition did not exhibit thixotropy defined in the present invention.

| Wavelength Conversion Film-Forming Composition 10 | |
|---|---|
| Hydroxyethyl Acrylate | 35 Parts by Mass |
| Urethane Acrylate (ARONIX M1600 (trade name), manufactured by Toagosei Co., Ltd.) | 65 Parts by Mass |
| Ethanol | 100 Parts by Mass |
| Photopolymerization Initiator (IRGACURE 184 (trade name)) | 3 Parts by Mass |
| Quantum Dots A (Maximum Emission Wavelength: 535 nm) | 0.01 Parts by Mass |
| Quantum Dots B (Maximum Emission Wavelength: 630 nm) | 0.01 Parts by Mass |

The obtained wavelength conversion film-forming composition was applied to the barrier layer of the barrier film (elongated film), which was prepared using the above-described above, using a die coater, and then the volatile component (ethanol) was removed in a drying zone. Next, the wavelength conversion film-forming composition 10 was applied again using a die coater and then was dried. This step was repeated twice. Next, the film was polymerized by being irradiated with light such that the total light irradiation dose was 900 mJ/cm². As a result, a wavelength conversion film 10 having a thickness of about 60 μm was obtained. The amount of the volatile component remaining in the wavelength conversion film was 0.1 parts by mass with respect to 100 parts by mass of the wavelength conversion film when determined by gas chromatography.

The barrier film prepared using the above-described method was adhered to a surface of the wavelength conversion film 10 where the barrier film is not provided using a pressure sensitive adhesive. As a result, a wavelength conversion member 10 was obtained.

Comparative Example 4

A wavelength conversion film 11 was obtained using the same method as in Example 2, except that the volatile component (butyl acrylate) was volatilized and removed using an IR heater and wind blowing before the exposure on the band, and then the web on the band was exposed to light. The amount of the volatile component remaining in the wavelength conversion film was 0.1 parts by mass with respect to 100 parts by mass of the wavelength conversion film when determined by gas chromatography.

The barrier film prepared using the above-described method was adhered to a surface of the wavelength conversion film 11 where the barrier film is not provided using a pressure sensitive adhesive. As a result, a wavelength conversion member 11 was obtained.

3. Evaluation

<Evaluation of Display Color>

A commercially available tablet terminal ("Kindle (registered trade name) Fire HDX 7", manufactured by Amazon.com Inc.) was disassembled to extract QDEF (quantum dot film, manufactured by 3M) from a backlight unit, and the wavelength conversion member according to each of the Examples and Comparative Examples which was cut into a rectangular shape was incorporated instead of QDEF. This way, a liquid crystal display device was prepared. The prepared liquid crystal display device was turned on such that the entire surface displayed white in Example 1, and the color thereof was evaluated by visual inspection. The measurement results are shown in Table 1.

<Observation of Distribution of Quantum Dots in Wavelength Conversion Film>

A cross-section was cut using a microtome from the wavelength conversion film obtained in each of the Examples and Comparative Examples, and a distribution of the quantum dots in the wavelength conversion film was observed by SEM-EDX. In order to map the distribution, a distribution of metal elements in the quantum dots was traced. The results are shown in Table 1.

As shown in Table 1, in the wavelength conversion members according to Examples, neutral white was displayed. However, in the wavelength conversion members according to Comparative Examples, bluish white was displayed. The reason for this is that the emission efficiency of the quantum dots was lower than a desired value, and blue light incident as excitation light was displayed as it was without being sufficiently converted into fluorescence.

In addition, in the wavelength conversion members according to Examples, the quantum dots were uniformly dispersed in the wavelength conversion film, and no clear bright spots were observed. The quantum dots had a particle size of several nanometers and thus were not able to be observed individually with a resolution of SEM-EDX. In a case where the quantum dots were uniformly dispersed, a flat distribution map was obtained. On the other hand, in Comparative Examples, bright spots were observed in the distribution map. The reason for this is presumed that the quantum dots forms aggregates, and the emission efficiency was decreased due to the aggregation of the quantum dots in consideration of a decrease in the emission efficiency estimated from the displayed color.

Based on the above results, the effectiveness of the present invention was verified.

TABLE 1

|  | Color | Distribution of Quantum Dots in Wavelength Conversion Film |
| --- | --- | --- |
| Example 1 | White | Uniform (No Bright Spots) |
| Example 2 | White | Uniform (No Bright Spots) |
| Example 3 | White | Uniform (No Bright Spots) |
| Example 4 | White | Uniform (No Bright Spots) |
| Example 5 | White | Uniform (No Bright Spots) |
| Example 6 | White | Uniform (No Bright Spots) |
| Example 7 | White | Uniform (No Bright Spots) |
| Comparative Example 1 | Bluish White | Bright Spots |
| Comparative Example 2 | Bluish White | Bright Spots |
| Comparative Example 3 | Bluish White | Bright Spots |
| Comparative Example 4 | Bluish White | Bright Spots |

EXPLANATION OF REFERENCES

1C: surface light source
1D: wavelength conversion member
2: backlight unit
2A: reflection plate
2B: retroreflecting member
3: liquid crystal cell unit
4: liquid crystal display device
10, 20: barrier film
11, 21: substrate
12, 22: barrier layer
13: unevenness imparting layer (mat layer, light diffusion layer)
30: wavelength conversion film
30A, 30B: quantum dots
30P: organic matrix
30L: wavelength conversion film-forming composition
$L_B$: excitation light (primary light, blue light)
$L_R$: red light (secondary light, fluorescence)
$L_G$: green light (secondary light, fluorescence)

What is claimed is:

1. A wavelength conversion film-forming composition which forms a wavelength conversion film by being applied to a substrate to form a coating film and curing the coating film,
the wavelength conversion film-forming composition comprising at least quantum dots, a volatile component, and a binder precursor that is soluble in or compatible with the volatile component, and optionally further comprising a binder that is soluble in the volatile component,
wherein the wavelength conversion film-forming composition is gellable in the presence of the volatile component, and
wherein the binder precursor comprises a monofunctional (meth)acrylate.

2. The wavelength conversion film-forming composition according to claim 1, comprising the binder having an upper critical solution temperature or the binder having a lower critical solution temperature.

3. The wavelength conversion film-forming composition according to claim 2, comprising cellulose acylate and/or polyvinyl alcohol as the binder having the upper critical solution temperature.

4. The wavelength conversion film-forming composition according to claim 1, further comprising a thixotropy imparting agent.

5. The wavelength conversion film-forming composition according to claim 4, comprising the binder precursor as the volatile component, and further comprising a polymerization initiator of the binder precursor.

6. The wavelength conversion film-forming composition according to claim 1, comprising the binder precursor and a polymerization initiator of the binder precursor,
wherein the wavelength conversion film-forming composition is caused to gel by polymerizing at least a part of the binder precursor.

7. The wavelength conversion film-forming composition according to claim 6, further comprising the binder.

8. The wavelength conversion film-forming composition according to claim 7, further comprising a thixotropy imparting agent.

* * * * *